United States Patent
Ammari et al.

(10) Patent No.: US 12,547,481 B2
(45) Date of Patent: Feb. 10, 2026

(54) SYSTEMS, METHODS, AND DEVICES FOR ACCESSING A COMPUTATIONAL DEVICE KERNEL

(71) Applicant: Samsung Electronics Co., Ltd., Suwon-si (KR)

(72) Inventors: Ramzi Ammari, Santa Clara, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/583,179

(22) Filed: Jan. 24, 2022

(65) Prior Publication Data

US 2023/0185643 A1 Jun. 15, 2023

Related U.S. Application Data

(60) Provisional application No. 63/289,633, filed on Dec. 14, 2021.

(51) Int. Cl.
*G06F 9/54* (2006.01)
*G06F 9/4401* (2018.01)

(52) U.S. Cl.
CPC ............ *G06F 9/545* (2013.01); *G06F 9/4406* (2013.01)

(58) Field of Classification Search
None
See application file for complete search history.

(56) References Cited

U.S. PATENT DOCUMENTS

| 5,036,466 A | * | 7/1991 | Fitzgerald | ............... F41G 7/007 714/E11.016 |
| 5,091,847 A | * | 2/1992 | Herbermann | ....... G06F 11/1666 714/4.2 |

(Continued)

FOREIGN PATENT DOCUMENTS

| CA | 1311850 C | 12/1992 |
| CN | 107992436 A | 5/2018 |

(Continued)

OTHER PUBLICATIONS

European Extended Search Report for Application No. 22209270.2, mailed Mar. 23, 2023.

(Continued)

*Primary Examiner* — Umut Onat
(74) *Attorney, Agent, or Firm* — Renaissance IP Law Group LLP

(57) ABSTRACT

A method may include receiving, at a computational device, a command, accessing, based on the command, using a programming interface, a kernel of an operating system operating on a computational circuit of the computational device, and performing, by the operating system, an operation based on the accessing. The accessing may include writing to one or more buckets using the programming interface. The one or more buckets may include one or more files. The accessing may include reading from one or more buckets using the programming interface. The method may further include performing, based on the accessing, a function call using the kernel. The receiving the command may include receiving, by a protocol, the command. The protocol may include a storage protocol. The storage protocol may include Nonvolatile Memory Express (NVMe). The receiving the command may include receiving, by command logic at the computational device, the command.

20 Claims, 19 Drawing Sheets

(56) References Cited

U.S. PATENT DOCUMENTS

| | | | |
|---|---|---|---|
| 7,673,180 B1 | 3/2010 | Chen et al. | |
| 8,055,816 B2 | 11/2011 | Asnaashari et al. | |
| 8,209,704 B1 | 6/2012 | McCann et al. | |
| 8,261,361 B2 | 9/2012 | Liu et al. | |
| 8,271,557 B1 | 9/2012 | Lysaght et al. | |
| 8,898,542 B2 | 11/2014 | Leggette et al. | |
| 9,122,794 B2 | 9/2015 | Smiljanic et al. | |
| 9,430,412 B2 | 8/2016 | Huang | |
| 9,542,122 B2 | 1/2017 | Bohn et al. | |
| 9,542,224 B2 | 1/2017 | Klee et al. | |
| 9,632,848 B1* | 4/2017 | Oldcorn | G06F 13/102 |
| 9,690,615 B2 | 6/2017 | Dong et al. | |
| 9,703,678 B2 | 7/2017 | Stall et al. | |
| 10,157,143 B2 | 12/2018 | Xu et al. | |
| 10,187,479 B2 | 1/2019 | Willmann | |
| 10,261,912 B2 | 4/2019 | Coppola et al. | |
| 10,372,376 B2 | 8/2019 | Singh et al. | |
| 10,372,648 B2 | 8/2019 | Qiu | |
| 10,394,746 B2 | 8/2019 | Kachare et al. | |
| 10,466,903 B2 | 11/2019 | Benisty et al. | |
| 10,534,546 B2 | 1/2020 | Benisty et al. | |
| 10,565,142 B2 | 2/2020 | Jin et al. | |
| 10,592,380 B2 | 3/2020 | Borello et al. | |
| 10,642,496 B2 | 5/2020 | Benisty et al. | |
| 10,678,432 B1 | 6/2020 | Dreier et al. | |
| 10,678,677 B1 | 6/2020 | Kuris et al. | |
| 10,705,952 B2 | 7/2020 | Kanaujia et al. | |
| 10,705,974 B2 | 7/2020 | Qiu et al. | |
| 10,740,217 B1 | 8/2020 | Stupachenko et al. | |
| 10,756,816 B1 | 8/2020 | Dreier | |
| 10,769,050 B2 | 9/2020 | Peck et al. | |
| 10,783,051 B2 | 9/2020 | Srinivasan et al. | |
| 10,798,224 B2 | 10/2020 | Masputra et al. | |
| 10,877,911 B1 | 12/2020 | Khan et al. | |
| 10,901,624 B1 | 1/2021 | Benisty | |
| 10,908,998 B2 | 2/2021 | Ding et al. | |
| 10,915,381 B2 | 2/2021 | Costa et al. | |
| 10,915,426 B2 | 2/2021 | Douglas | |
| 10,949,321 B1 | 3/2021 | Volpe et al. | |
| 10,997,093 B2 | 5/2021 | Chang | |
| 11,074,114 B1 | 7/2021 | Kostyushko et al. | |
| 11,086,800 B2 | 8/2021 | Andrus et al. | |
| 11,138,134 B2 | 10/2021 | Dracea et al. | |
| 11,403,044 B2 | 8/2022 | Khan et al. | |
| 11,409,465 B2 | 8/2022 | Nimmagadda et al. | |
| 11,442,733 B2 | 9/2022 | Jones | |
| 11,449,240 B1 | 9/2022 | Jadon et al. | |
| 11,467,987 B1 | 10/2022 | Jones | |
| 11,487,471 B2 | 11/2022 | Greer et al. | |
| 11,507,298 B2 | 11/2022 | Yang et al. | |
| 11,507,301 B2 | 11/2022 | Norman | |
| 11,544,000 B2 | 1/2023 | Furey et al. | |
| 11,561,909 B2 | 1/2023 | Hahn et al. | |
| 2001/0052038 A1* | 12/2001 | Fallon | G06F 3/0658 |
| | | | 710/22 |
| 2006/0262124 A1* | 11/2006 | Stauffer | G06F 12/10 |
| | | | 345/501 |
| 2010/0005482 A1* | 1/2010 | Mukker | G06F 9/5016 |
| | | | 719/321 |
| 2010/0306766 A1* | 12/2010 | Schneider | G06F 9/45533 |
| | | | 718/1 |
| 2012/0311117 A1 | 12/2012 | Fulop et al. | |
| 2012/0311290 A1* | 12/2012 | White | G06F 13/102 |
| | | | 711/170 |
| 2014/0033189 A1* | 1/2014 | Buswell | G06F 9/45558 |
| | | | 717/170 |
| 2014/0351831 A1* | 11/2014 | Adda | G06F 11/0715 |
| | | | 719/321 |
| 2015/0261720 A1 | 9/2015 | Kagan et al. | |
| 2016/0378545 A1 | 12/2016 | Ho | |
| 2018/0210770 A1* | 7/2018 | Vajravel | G06F 9/545 |
| 2018/0285252 A1 | 10/2018 | Kwon et al. | |
| 2018/0307638 A1* | 10/2018 | Jin | G06F 13/28 |
| 2019/0005234 A1* | 1/2019 | Klonowski | G06F 11/3466 |
| 2019/0205190 A1 | 7/2019 | Hebbal et al. | |
| 2020/0034073 A1 | 1/2020 | Saha et al. | |
| 2020/0127836 A1 | 4/2020 | Pappachan et al. | |
| 2020/0201558 A1 | 6/2020 | Cho et al. | |
| 2020/0293354 A1 | 9/2020 | Song et al. | |
| 2020/0301898 A1 | 9/2020 | Samynathan et al. | |
| 2020/0341933 A1 | 10/2020 | Kachare et al. | |
| 2020/0343974 A1 | 10/2020 | Dreier | |
| 2020/0379828 A1 | 12/2020 | Thorpe et al. | |
| 2021/0011855 A1 | 1/2021 | Charan et al. | |
| 2021/0019218 A1 | 1/2021 | Zhu et al. | |
| 2021/0049036 A1 | 2/2021 | Poess et al. | |
| 2021/0073116 A1 | 3/2021 | Rogers et al. | |
| 2021/0117246 A1 | 4/2021 | Lal et al. | |
| 2021/0150770 A1 | 5/2021 | Appu et al. | |
| 2021/0208997 A1 | 7/2021 | Immonen | |
| 2021/0255793 A1 | 8/2021 | Jaiyeoba et al. | |
| 2021/0311641 A1 | 10/2021 | Prakashaiah et al. | |
| 2022/0276803 A1 | 9/2022 | Yang et al. | |
| 2022/0300165 A1 | 9/2022 | Kerr et al. | |
| 2022/0300207 A1 | 9/2022 | Tsuji et al. | |
| 2022/0318160 A1 | 10/2022 | Jones et al. | |
| 2022/0350604 A1 | 11/2022 | Jones | |
| 2022/0365709 A1 | 11/2022 | Raghunath et al. | |

FOREIGN PATENT DOCUMENTS

| | | |
|---|---|---|
| CN | 109656473 A | 4/2019 |
| CN | 110825670 A | 2/2020 |
| CN | 111427808 A | 7/2020 |
| CN | 112579254 A | 3/2021 |
| CN | 112905472 A | 6/2021 |
| CN | 113342590 A | 9/2021 |
| WO | 2015067983 A1 | 5/2015 |
| WO | 2018175059 A1 | 9/2018 |

OTHER PUBLICATIONS

Do, Jaeyoung et al., "Cost-Effective, Energy-Efficient, and Scalable Storage Computing for Large-scale AI Applications", ACM Transactions on Storage, Association for Computing Machinery, vol. 16, No. 4, Article 21, 2020, pp. 1-37.

European Extended Search Report for Application No. 22185404.5, mailed Nov. 30, 2022.

Li, Hongwei et al., "Research of 'Stub' Remote Debugging Technique", 2009 4th International Conference on Computer Science & Education, 2009, pp. 990-994.

Lin, Tsung-Han et al., "Hardware-Assisted Reliability Enhancement for Embedded Multi-Core Virtualization Design", 2011 14th IEEE International Symposium on Object/Component/Service-Oriented Real-Time Distributed Computing, 2011, pp. 241-249.

Malone, Kim et al., "NVMe Computation Storage Standardizing Offload of Computation via NVMe", Storage Developer Conference, Virtual Conference, 2021, 24 pages.

Office Action for U.S. Appl. No. 17/482,412, mailed Dec. 9, 2022.

Oh, Myonghoon et al., "Mitigating Journaling Overhead via Atomic Write," 2018 International Conference on Information and Communication Technology Convergence (ICTC), IEEE, pp. 539-542.

Torabzadehkashi, Mahdi et al: "Computational Storage: An Efficient and Scalable Platform for Big Data and HPC Applications", Journal of Big Data, vol. 6, No. 1, 2019, 29 pages.

Xuan, Chaoting et al., "Toward Revealing Kernel Malware Behavior in Virtual Execution Environments", International Workshop on Recent Advances in Intrusion Detection. Springer, Berlin, Heidelberg, 2009, 20 pages.

Yang, Ziye et al., "SPDK vhost-NVMe: Accelerating I/Os in Virtual Machines on NVMe SSDs via User Space vhost Target", 2018 IEEE 8th International Symposium on Cloud and Service Computing (SC2), 2018, pp. 67-76.

Corrected Notice of Allowability for U.S. Appl. No. 17/482,412, mailed Nov. 13, 2023.

Notice of Allowance for U.S. Appl. No. 17/482,412, mailed Dec. 6, 2023.

(56) References Cited

OTHER PUBLICATIONS

Happily Embedded, "happily embedded, RTOS Concepts—Kernel Objects" 2015, https://happilyembedded.wordpress.com/2015/10/23/rtos-conecpts-kernel-objects/.

Office Action for U.S. Appl. No. 17/692,165, mailed Sep. 27, 2023.

Vaught, Andy, "Introduction to Named Pipes," Sep. 1997, https://www.linuxjournal.com/article/2156.

Final Office Action for U.S. Appl. No. 17/482,412, mailed Apr. 7, 2023.

Notice of Allowance for U.S. Appl. No. 17/482,412, mailed Jun. 28, 2023.

Akin, T. Allen et al., "A Prototype for an Advanced Command Language," ACM-SE 16: Proceedings of the 16th Annual Southeast Regional Conference, Apr. 1978, pp. 96-102.

Ellis, John R., "A Lisp Shell," Computer Science Department, Yale University, 1980, pp. 24-34.

European Extended Search Report for Application No. 23150871.4, mailed Apr. 12, 2023.

Kernighan, Brian W. et al., "Software Tools," Bell Laboratories, 1976, 6 pages.

Lin, Jim-Min et al., "Integrating Existing Software Packages Using the Virtual Machine Technique", Journal of Systems and Software, vol. 18, Issue 3, Jul. 1992, pp. 207-218.

Meyer, Veronika et al., "The UNIX® Timesharing Operating System," Computer Physics Communications, vol. 50, Issues 1-2, Jul. 1988, pp. 51-57.

Morales-Velazquez, Luis et al., "Open-Architecture System Based on a Reconfigurable Hardware-Software Multi-Agent Platform for CNC Machines," Journal of Systems Architecture, vol. 56, Issue 9, Sep. 2010, pp. 407-418.

Smith, Terence R. et al., "Virtual Structures—A Technique for Supporting Scientific Database Applications," Entity-Relationship Approach—ER '94 Business Modelling and Re-Engineering, ER 1994, Lecture Notes in Computer Science, vol. 881, 1994, 22 pages.

Thomas, Mark A., "I/O Redirection and Pipes," Dec. 2019, retrieved from https://homepages.uc.edu/~thomam/Intro_Unix_Text/IO_Redir_Pipes.html Mar. 2023, 7 pages.

Thompson, T. J., "A Utilitarian Approach to CAD," 19th Design Automation Conference, IEEE, 1982, pp. 23-29.

Notice of Allowance for U.S. Appl. No. 17/692,165, mailed Mar. 4, 2024.

European Office Action for Application No. 22209270.2, mailed Dec. 22, 2025.

\* cited by examiner

SYSTEMS, METHODS, AND DEVICES FOR ACCESSING A COMPUTATIONAL DEVICE KERNEL

REFERENCE TO RELATED APPLICATION

This application claims priority to, and the benefit of, U.S. Provisional Patent Application Ser. No. 63/289,633 titled "Systems, Methods, and Devices for Communicating with a Device Kernel Through an Interface" filed Dec. 14, 2021 which is incorporated by reference.

TECHNICAL FIELD

This disclosure relates generally to computational devices, and more specifically to systems, methods, and devices for accessing a computational device kernel.

BACKGROUND

A computational device such as an accelerator device or a computational storage device may include one or more computational resources that may perform operations on data. A host may offload a processing task to the computational device, for example, by sending a user program and/or input data to the device. The one or more computational resources may execute a program (e.g., a user program) to perform one or more operations on the input data.

The above information disclosed in this Background section is only for enhancement of understanding of the background of the inventive principles and therefore it may contain information that does not constitute prior art.

SUMMARY

A method may include receiving, at a computational device, a command, accessing, based on the command, using a programming interface, a kernel of an operating system operating on a computational circuit of the computational device, and performing, by the operating system, an operation based on the accessing. The accessing may include writing to one or more buckets using the programming interface. The one or more buckets may include one or more files. The accessing may include reading from one or more buckets using the programming interface. The method may further include performing, based on the accessing, a function call using the kernel. The receiving the command may include receiving, by a protocol, the command. The protocol may include a storage protocol. The storage protocol may include Nonvolatile Memory Express (NVMe). The receiving the command may include receiving, by command logic at the computational device, the command. The command logic may include a driver operating on the computational circuit. The command logic may include a device controller. The command logic may include a command parser. The method may further include receiving, by the command parser, a device command, and passing, by the command parser, the device command to a device controller. The performing the operation may include starting, by the kernel, a program on the operating system. The program may include a tool of the operating system. The starting the program may include starting the program in a user space of the operating system. The method may further include storing, at the computational device, a user program. The starting the program in a user space of the operating system may include starting the user program in the user space of the operating system. The method may further include downloading, to the computational device, the user program. The storing the user program may include storing the user program in a slot. The program may include an analysis program, and the performing the operation further may include running, using the analysis program, a user program on the operating system. The analysis program may include a debugging program. The accessing may include passing one or more parameters to the kernel. The one or more parameters may include a program identifier, and the performing the operation may include starting, by the kernel, on the operating system, a program identified by the program identifier. The one or more parameters may include one or more arguments, and the performing the operation may include starting, by the kernel, with the one or more arguments, the program identified by the program identifier. The one or more parameters may include a number of the one or more arguments. The one or more parameters may include an indication of one or more compute resources of the computational circuit, and the performing the operation may include performing the operation using the one or more compute resources. The indication may be a first indication, the one or more parameters may include one or more second indications of one or more portions of the one or more compute resources, and the performing the operation may include performing the operation using the one or more portions of the compute resources. The method may further include returning, using the programming interface, a result of the operation. The returning may include reading a bucket. The returning may include reading a file. The result may include information about the computational circuit. The programming interface may include a module of the kernel.

A device may include a computational circuit configured to run an operating system including a kernel, wherein the kernel may be configured to operate a programming interface, and command logic configured to receive a command, and perform, based on the command, using the programming interface, an access of the kernel, wherein the operating system may be configured to perform, based on the access, an operation. The kernel may be configured to load a kernel module including the programming interface. The command logic may include a driver operating on the computational circuit. The command logic may include a device controller. The command logic may include a command parser configured to receive the command, and perform the access of the kernel based on the command. The command may be a first command, and the command parser may be further configured to receive a second command, and pass the second command to a device controller. The command logic may be configured to receive the command using a protocol. The protocol may include a storage protocol. The storage protocol may include Nonvolatile Memory Express (NVMe).

A system may include a host configured to send, using a protocol, a command, and a device communicatively coupled to the host, the device including a computational circuit configured to run an operating system including a kernel, wherein the kernel may be configured to operate a programming interface, wherein the device may be configured to receive, using the protocol, the command, and perform, based on the command, using the programming interface, an access of the kernel. The operating system may be configured to perform, based on the access, an operation. The host may include a processor configured to operate an initiator device driver that uses the protocol, and the host may be configured to send the command using the initiator device driver. The processor may be further configured to operate a command line interface to provide the command to the initiator device driver. The computational circuit may be configured to operate a target device driver to receive, using the protocol, the command.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
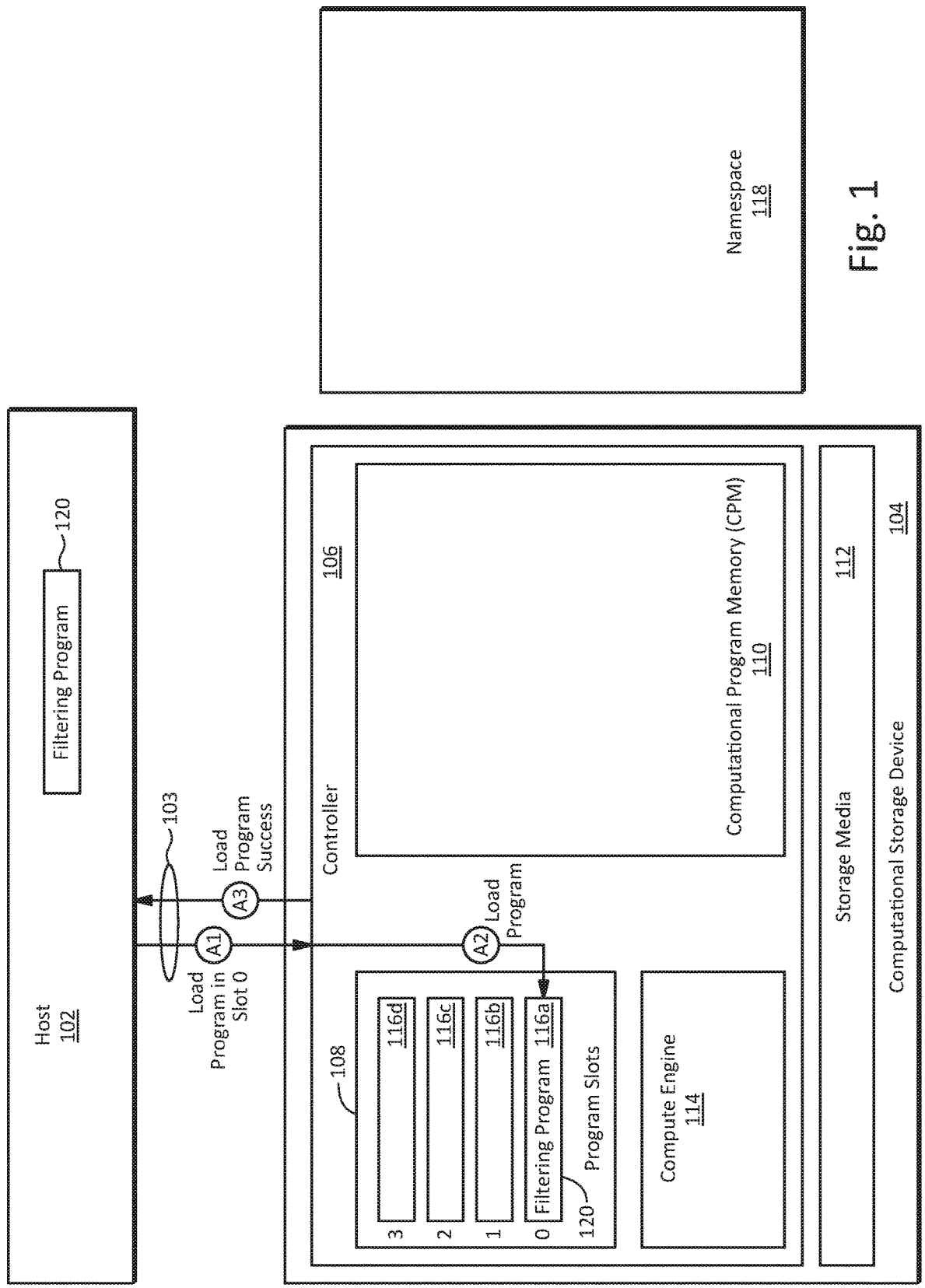
FIG. 1 illustrates an embodiment of a scheme for downloading a program to a computational storage device in accordance with example embodiments of the disclosure.

A host may offload processing operations to a computational device that may include one or more computational resources. For example, a computational storage device may include one or more computational resources that may run one or more programs to perform the offloaded operations using data stored at the device. The computational storage device may enable a user (e.g., a host) to download one or more programs that may be stored in one or more program slots at the device. The computational resources may run an operating system that may execute the one or more programs.

The computational device may use a protocol (e.g., a storage protocol such as Nonvolatile Memory Express (NVMe)) to enable a user to pass commands, data, and/or the like, to and/or from the device. One or more commands may be used to enable the host to download a program to the device, save a program in a program slot at the device, execute a program, and/or read results from a program. The one or more commands, however, may not specify how a program may be executed by the operating system, which of the computational resources may execute the program, and/or the like.

A computational device in accordance with example embodiments of the disclosure may implement a programming interface to enable a user to access a kernel of an operating system running on one or more computational resources of the computational device. In some embodiments, a programming interface may enable a device controller to start a program by writing to one or more kernel buckets which may be implemented, for example, with one or more files, one or more memory locations, and/or in any other manner in which information may be passed to a kernel of an operating system. For example, a device controller may write one or more parameters such as a program identifier (ID), a number of arguments, and one or more arguments to first, second, and third kernel buckets, respectively. In some embodiments, any number of parameters may be passed using any number of buckets. For example, in some embodiments, multiple parameters may be written to one bucket, and the kernel may parse the parameters it receives using the bucket. Writing to a kernel bucket may trigger a function call that may invoke the program specified by the program ID and pass the one or more arguments to the program which may operate, for example, in a user space of the operating system.

In some embodiments, a programming interface may enable a user to specify which of the computational resources (or subcomponents thereof) may execute a program. For example, a device controller may write one or more additional parameters to one or more additional kernel buckets to specify one or more compute engines such as specific processors, field programmable gate arrays (FPGAs), application specific integrated circuits (ASICs), and/or the like, the operating system should use to run the program. If a specified compute engine includes multiple subcomponents such as processor cores, ASIC submodules, and/or the like, the one or more additional parameters may specify which of one or more subcomponents of a compute engine the operating system should use to run the program.

Depending on the implementation details, using a programming interface to access a kernel of an operating system running on one or more computational resources of a computational device may enable the device to execute programs while reducing or eliminating security risks. In some embodiments, the kernel may implement one or more error and/or validity checks on the parameters and/or other information the user may place in one or more buckets, for example, to check that the parameters are correct, within expected ranges, and/or the like. Running a downloaded user program on the one or more computational resources may present one or more inherent risks. However, a programming interface in accordance with example embodiments of the disclosure may limit the risk by limiting the user's access to the kernel, for example, by exposing controlled buckets to the user. In some embodiments, only the buckets may be exposed to a user. Depending on the implementation details, limiting a user's access to the kernel may prevent a user from accessing one or more portions (e.g., any) of the kernel that may pose a security risk.

Moreover, depending on the implementation details, a programming interface in accordance with example embodiments of the disclosure may provide a user with a simplified and/or easier method for offloading processing tasks to a computational device. For example, in some embodiments, the programming interface may hide the complexity of the operating system kernel (e.g., provide an amount of abstraction) by only exposing buckets that may be relevant to executing a program. Thus, a user may invoke a program in a manner that may not involve detailed knowledge of lower level operations such as system calls, input and/or output (I/O) commands, and/or the like, of an operating system running on the computational resources. For example, in some operating systems, starting a program may involve a system call that may be invoked with one or more parameters and may be checked to determine if the system call was invoked properly. However, with a programming interface in accordance with example embodiments of the disclosure, a user may only need to write one or more parameters to one or more kernel buckets to start a program, and a driver, firmware, and/or the like in the kernel may tend to the details of invoking the system call to start the program. Moreover, in some embodiments, an interface in accordance with the disclosure may be implemented in a manner that may present few if any changes to a user when the version of the underlying operating system changes. Depending on the implementation details, this may further shield a user from the complexity of an operating system.

Additionally, depending on the implementation details, a programming interface in accordance with example embodiments of the disclosure may enable a computational device to implement a wide range of features. For example, a programming interface may implement a general purpose, bidirectional interface for passing programs, commands, data, and/or the like, to and/or from a kernel of an operating system running on one or more computational resources of a computational device. In some embodiments, any number and/or types of kernel objects (e.g., buckets) may be exposed through the programming interface. For example, a programming interface may be used to export data from a kernel to a user space. As another example, a programming interface may enable a user to invoke one or more operating system utilities, e.g., tools, filters, and/or the like. As a further example, a programming interface may enable a user to debug a downloaded user program while it is running on the operating system.

For purposes of illustration, some embodiments may be described in the context of a computational storage device. However, the principles are not limited to storage devices and may be applied to any computational devices to which processing operations may be offloaded.

FIG. 1 illustrates an embodiment of a scheme for downloading a program to a computational storage device in accordance with example embodiments of the disclosure. The embodiment illustrated in FIG. 1 may include a host 102, and a computational storage device 104 connected through a communication connection 103. The communication connection 103 may be implemented, for example, with a network (e.g., Ethernet), an interconnect (e.g., Peripheral Component Interconnect Express (PCIe)), and/or the like.

The computational storage device 104 may include a controller 106, and a storage media 112. The storage media 112 may include, for example, nonvolatile memory for storing data. The controller 106 may implement, for example, a storage protocol such as NVMe that may enable the host 102 and the storage device 104 to exchange commands, data, and/or the like, over the communication connection 103.

The controller 106 may include a program memory area 108, a computational program memory (CPM) 110, and one or more compute engines 114. The program memory area 108 may have one or more program slots 116 (in this example, four program slots 116a-116d) for storing one or more programs. The computational program memory 110 may be used, for example, as a working memory for one or more programs that may be stored in the one or more program slots 116. The one or more compute engines 114 may include one or more compute resources for running the one or more programs stored in the program slots 116. In some embodiments, the controller 106 may execute instructions (e.g., software, firmware, and/or the like) that may cause it to operate as described herein.

In some embodiments, the controller 106 may implement one or more namespaces 118 (e.g., NVMe namespaces) for data stored in the storage media 112. In some embodiments, the use of multiple namespaces may essentially cause the storage device to appear and/or function as multiple storage devices, for example, to the host 102.

An example process flow for downloading a program from the host 102 to the computational storage device 104 may proceed as follows. In this example, the host 102 and storage device 104 may communicate using an NVMe protocol over the communication connection 103. The host 102 may initiate the download by sending an Identify Controller command to the controller 106. The controller 106 may respond by returning a controller data structure (e.g., an Identify I/O Command Set specific controller data structure) that the host 102 may examine to determine the program types and/or formats that may be supported by the controller 106. The host 102 may then issue a command and/or request (e.g., a Get Log Page command) to retrieve data from the controller. The controller 106 may respond by sending a response (e.g., a Get Program Slot Information Log Page) which the host 102 may examine to determine which, if any, of the program slots 116 are available. In this example, four slots 116a-116d are identified as Slot 0 through Slot 3, respectively.

If a program slot 116 is available, the host 102 may issue a Load Program command specifying an empty slot and passing an executable program 120 as command data as shown at operation A1. In this example, the host 102 may specify Slot 0 and pass a filtering program 120. At operation A2, the controller 106 may receive the filtering program 120 and load it into Slot 0 (116a). At operation A3, the controller 106 may send a Load Program Success message to the host 102 to terminate the process flow.

Figure 2:
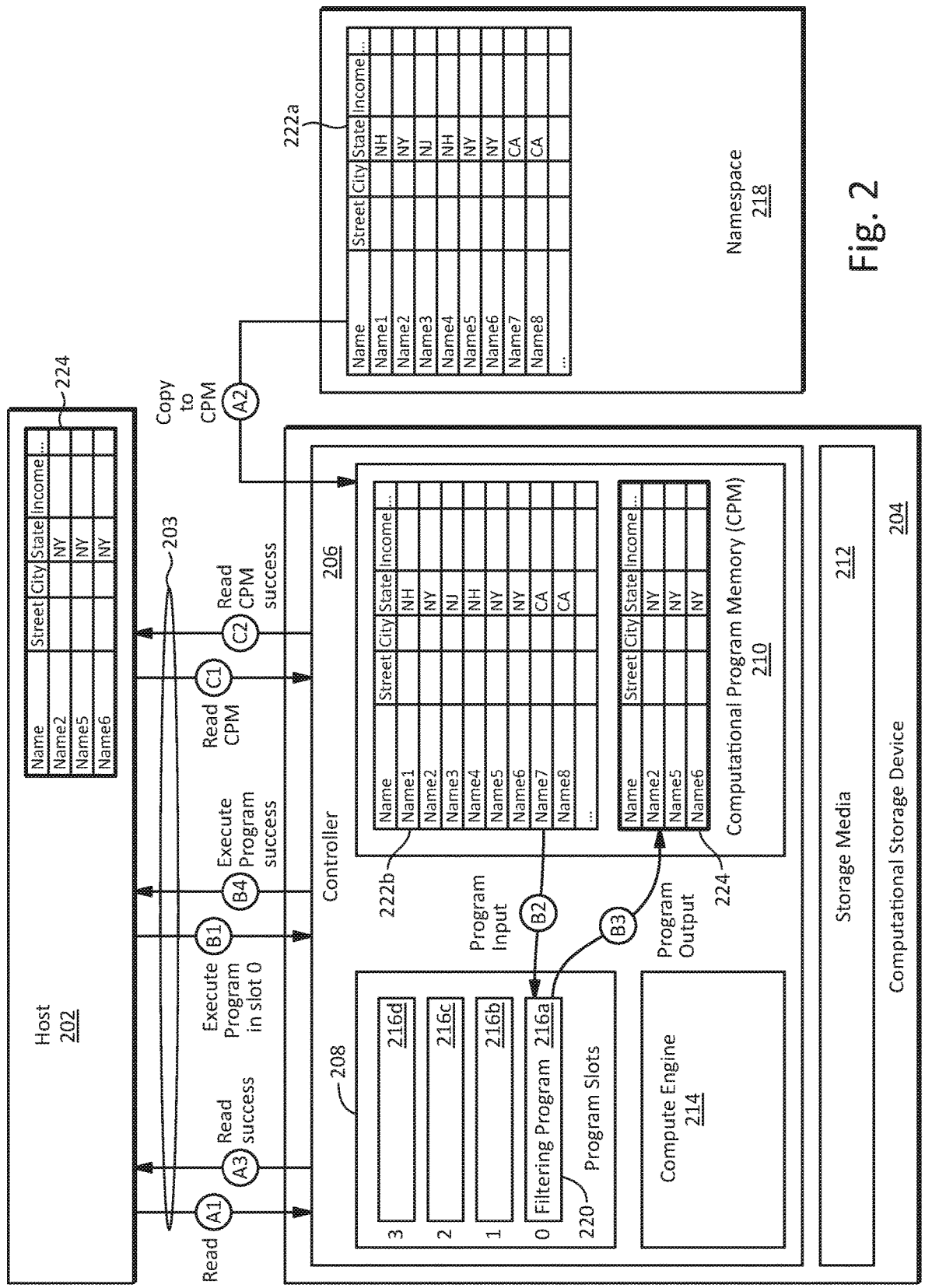
FIG. 2 illustrates an embodiment of a scheme for executing a program in a computational storage device in accordance with example embodiments of the disclosure.

FIG. 2 illustrates an embodiment of a scheme for executing a program in a computational storage device in accordance with example embodiments of the disclosure. The embodiment illustrated in FIG. 2 may include components similar to those illustrated in FIG. 1, and elements having reference numerals ending in the same digits may be similar. The embodiment illustrated in FIG. 2 may be used, for example, to execute the filtering program 120 downloaded as shown in FIG. 1.

Referring to FIG. 2, a process for executing the filtering program 220 may proceed as follows. To read stored data into the computational program memory 210, the host 202 may issue a Read command to the controller 206 as shown at operation A1. In some embodiments, the Read command may include a parameter (e.g., an argument) specifying a region of the computational program memory 210. In response to the Read command, the controller 206 may copy data 222a, which in this example may be a database, from a namespace 218 (e.g., a namespace mapped to the storage media 212) to create a copy of the data 222b in a region of the computational program memory 210 specified by the host 202 as shown at operation A2. The controller 206 may send a Read Success message to the host 202 at operation A3.

To execute the program 220 in Slot 0 (216a), the host 202 may issue an Execute Program command to the controller 206 as shown at operation B1. In some embodiments, the Execute Program command may include one or more parameters (e.g., arguments) specifying, for example, which slot number the program 220 to be executed is stored in, which region or regions of the computational program memory 210 are to be used as input by the program 220, and/or which region or regions of the computational program memory 210 are to be used for output by the program 220. At operation B2, the copy 222b of the data may be used as input to the program 220 which, in this example, may be a filtering program. The filtering program 220 may be run, for example, using the one or more compute engines 214. In this example, the filtering program 220 may select the database entries from the data 222b in which the state is NY. At operation B3, the program 220 may output the selected database entries (e.g., the filtered data) 224 to the computational program memory 210. At operation B4, the controller 206 may send an Execute Program Success message to the host 202. In some embodiments, in response to the completion of the program 220, an entry may be posted to a completion queue (e.g., an NVMe completion queue) indicating the execution status of the program and returning an optional return value (e.g., a 64-bit return value) from the program 220.

To read the resulting filtered data, the host 202 may send a Read CPM command to the controller 206 at operation C1. The controller 206 may transfer the output data (e.g., the filtered data) 224 to the host 202 and send a Read CPM Success message to the host 202 at operation C2. In some embodiments, the controller 206 may know the location of the output data 224 from a parameter sent with the Execute Program command.

In some embodiments, the one or more compute engines 114 and 214 illustrated in FIG. 1 and FIG. 2, respectively, may run an operating system to execute one or more programs stored in the program slots 116 and 216. In some embodiments, a specification may define the commands and/or parameters that may be used to implement the schemes for downloading and/or invoking a program as illustrated in FIG. 1 and FIG. 2. For example, in some embodiments, the commands and/or parameters may be implemented as NVMe commands and/or parameters. However, the specification may not specify how a program may be executed by the operating system, how results and/or other data may be passed to and/or from the operating system, which of the computational resources may execute the program, and/or the like.

Figure 3:
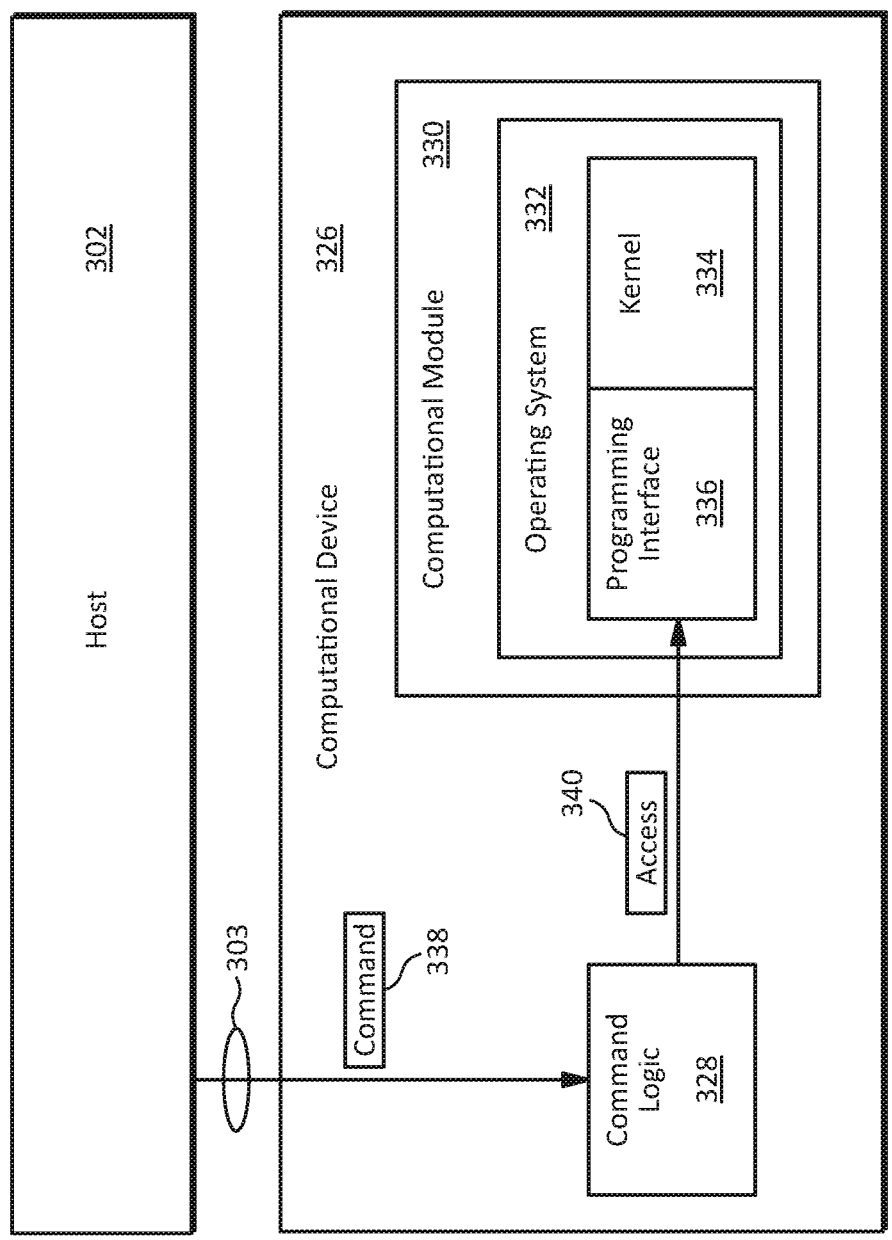
FIG. 3 illustrates an embodiment of a scheme for accessing a computational device kernel in accordance with example embodiments of the disclosure.

FIG. 3 illustrates an embodiment of a scheme for accessing a computational device kernel in accordance with example embodiments of the disclosure. The embodiment illustrated in FIG. 3 may be used, for example, to implement any of the Load Program command, Read command, Execute Program command, and/or Read CPM command described above with respect to FIG. 1 and/or FIG. 2.

The embodiment illustrated in FIG. 3 may include a host 302, and a computational device 326 communicating through a connection 303. The computational device 326 may include command logic 328 and a computational module 330.

The computational module 330 may include one or more computational resources that may run an operating system 332 having a kernel 334. The kernel 334 may implement a programming interface 336. In some embodiments, the programming interface 336 may also be referred to as a virtual interface, an application programming interface, a computational device application programming interface (CDAPI), a computational storage application programming interface (CSAPI), and/or a device computational storage application programming interface (DCSAPI), depending on the context.

The command logic 328 may be configured to receive a command 338 from the host 302. In response to receiving the command 338, the command logic 328 may perform an access 340 of the kernel 334 using the programming interface 336. In response to the access 340, the kernel 334 may perform an operation using the one or more computational resources of the computational module 330. For example, the kernel 334 may start a program that may have been downloaded to the computational device 326. In some embodiments, the kernel 334 may implement the programming interface 336 using one or more buckets that the command logic 328 may write to and/or read from to enable the command logic to access one or more features of the kernel 334.

The host 302 may be implemented with any component or combination of components that may utilize the computational resources of the computational module 330. For example, the host 302 may include to one or more of a client device, a server, a storage node, a central processing unit (CPU), and/or the like.

The connection 303 may be implemented with a network, an interconnect, and/or the like, or a combination thereof, using any type of interface and/or protocol. For example, the connection 303 may be implemented with PCIe, NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, Infini-Band, Serial ATA (SATA), Small Computer Systems Interface (SCSI), Serial Attached SCSI (SAS), iWARP, and/or the like, or any combination thereof.

For example, in some embodiments, connection 303 may be implemented with an NVMe protocol operating over a PCIe interconnect. As another example, in some embodiments, connection 303 may be implemented with an NVMe-oF protocol operating over an Ethernet connection. In such embodiments, and depending on the implementation details, the NVMe protocol may provide a mechanism for passing commands, data, and/or the like to and/or from the kernel 334 that may be efficient, effective, convenient, standardized, flexible, and/or the like. However, in other embodiments, any other types of interfaces, protocols, and/or the like may be used.

In some embodiments, the connection 303 may implement a coherent (e.g., memory coherent, cache coherent, and/or the like) or memory semantic interface such as Compute Express Link (CXL), and/or a coherent protocol such as CXL.mem, CXL.cache, and/or CXL.IO. Other examples of coherent and/or memory semantic interfaces and/or protocols that may be used may include Gen-Z, Coherent Accelerator Processor Interface (CAPI), Cache Coherent Interconnect for Accelerators (CCIX), and/or the like.

The computational device 326 may be implemented with any type of device that may include a computational module 330. For example, the computational device 326 may be implemented with a storage device, an accelerator, a graphics processing unit (GPU), a network interface card (NIC), and/or the like, or a combination thereof. In some embodiments, the computational device 326 may include one or more additional components related to a functionality of the device. For example, the computational device 326 may include a storage media and/or a media translation layer (e.g., a flash translation layer (FTL)) if implemented as a storage device, a network interface and/or a modem if implemented as a NIC, a graphics pipeline if implemented as a GPU, and/or the like.

In embodiments in which the computational device 326 is implemented as a storage device, the storage device may include any type of nonvolatile storage media based, for example, on solid state media (e.g., a solid state drive (SSD)), magnetic media (e.g., a hard disk drive (HDD)), optical media, and/or the like. For example, in some embodiments, a computational storage device may be implemented as an SSD based on not-AND (NAND) flash memory, persistent memory such as cross-gridded nonvolatile memory, memory with bulk resistance change, phase change memory (PCM), and/or the like, or any combination thereof.

In embodiments in which the computational device 326 is implemented as a storage device, the storage device may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, and/or the like. Any such storage devices may be implemented entirely or partially with, and/or used in connection with, a server chassis, server rack, dataroom, datacenter, edge datacenter, mobile edge datacenter, and/or any combinations thereof.

The computational module 330 may include one or more computational resources that may run the operating system 332 and/or kernel 334 and/or that may perform any type of processing that may be controlled, initiated, offloaded, handed off, assigned, and/or the like, by the operating system 332 and/or kernel 334. For example, in addition to running the operating system 332 and/or kernel 334, the one or more computational resources may run one or more programs (e.g., downloaded user programs) in a user space of the operating system.

The computational resources may include, for example, one or more compute engines such as one or more processors (e.g., CPUs such as complex instruction set computer (CISC) processors such as x86 processors and/or reduced instruction set computer (RISC) processors such as ARM processors), ASICs, FPGAs, GPUs, neural processing units (NPUs), tensor processing units (TPUs), and/or the like. Moreover, in some embodiments, one or more of the computational resources of the computational module 330 may have one or more subcomponents such as processor cores, ASIC submodules, and/or the like.

Although shown as a single component, the computational module 330 may be distributed partially or entirely, as one or more separate components, and/or between one or more other components such as the command logic 328, a device controller, and/or the like.

The operating system 332 may be implemented with any operating system including Linux®, Android, Tizen™, embedded Windows®, and/or the like.

The programming interface 336 may be implemented, for example, with program code that may be built into the kernel 334 (e.g., compiled into the kernel), inserted into the kernel 334 as a module, and/or the like.

The command logic 328 may be implemented, for example, as a separate component, as part of a device controller (e.g., a storage device controller), as part of the computational module 330, or in any other manner or combination thereof. For example, in an embodiment in which the command logic 328 is implemented at least partially as part of a device controller, the command logic 328 may be implemented at least partially with firmware (FW) that may be run by the device controller. As another example, in some embodiments, the command logic 328 may be implemented at least partially as a device driver in a kernel of an operating system running, for example, on one or more compute resources of the computation module 330.

The command logic 328, and any other functionality disclosed herein, may be implemented hardware, software, firmware, or any combination thereof including combinational logic, sequential logic, one or more timers, counters, registers, and/or state machines, one or more complex programmable logic devices (CPLDs), FPGAs, ASICs, CPUs, GPUs, NPUs, TPUs, and/or the like, executing instructions stored in any type of memory, or any combination thereof. In some embodiments, one or more components, including the command logic 328, may be implemented as a system-on-chip (SOC).

The command logic 328 may be physically interfaced to the computational module 330 in any suitable manner including using one or more serial or parallel buses, networks, interconnects, and/or the like. For example, in some embodiments, the command logic 328, and/or any other component into which the command logic 328 may be partially or entirely integrated, may be physically interfaced to the computational module 330 using one or more PCIe connections.

Figure 4:
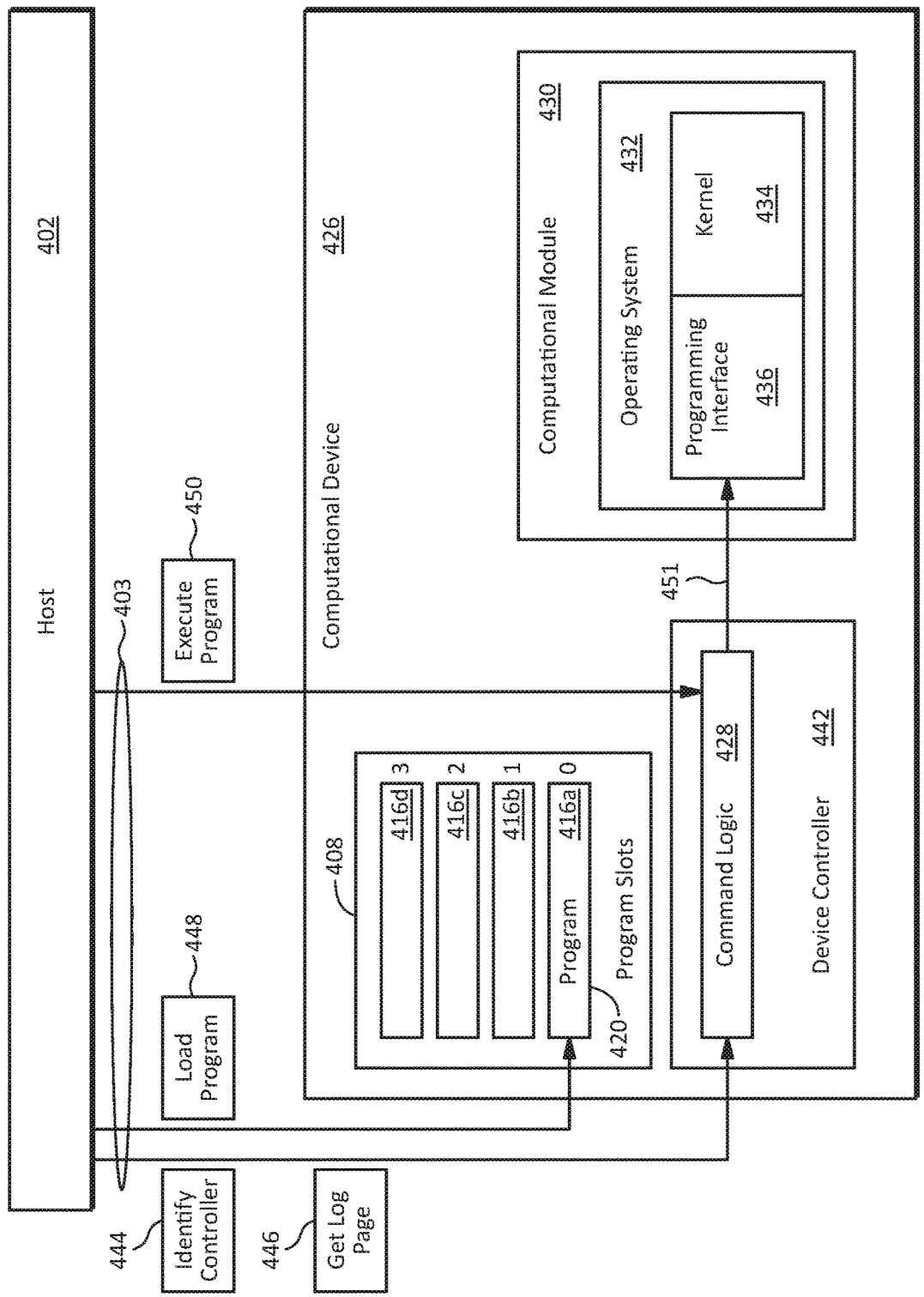
FIG. 4 illustrates an embodiment of a system having a computational device with a kernel that may be accessed using a programming interface in accordance with example embodiments of the disclosure.

FIG. 4 illustrates an embodiment of a system having a computational device with a kernel that may be accessed using a programming interface in accordance with example embodiments of the disclosure. The embodiment illustrated in FIG. 4 may be used, for example, to implement any of the embodiments disclosed herein, including those illustrated in FIG. 1, FIG. 2, and/or FIG. 3 and may include some components similar to those illustrated in FIG. 1, FIG. 2, and/or FIG. 3 where elements having reference numerals ending in the same digits may be similar.

The embodiment illustrated in FIG. 4 may include a host 402 and a computational device 426 communicating through a connection 403. The computational device 426 may include a device controller 442 and command logic 428. The command logic 428 may be integrated into the device controller 442 as shown in FIG. 4, or it may be located anywhere else in the computational device 426. The computational device 426 may also include a program memory area 408 having one or more slots 416 similar to the program memory areas 108 and 208 illustrated in FIG. 1 and FIG. 2. For purposes of illustration, the embodiment illustrated in FIG. 4 may be implemented using an NVMe protocol to communicate between the host 402 and the computational device 426, but any other protocol may be used. In some embodiments, the NVMe or other protocol may be implemented with a controller (e.g., a protocol controller such as an NVMe controller) that may include, for example, the program memory area 408, computational module 430, and/or the like. In some embodiments, a controller such as a protocol controller may include, or be included in, the device controller 442.

Referring to FIG. 4, a method for downloading and executing a program 420 in accordance with example embodiments of the disclosure may proceed as follows. The host 402 may issue an Identify Controller command 444 to the command logic 428 in the device controller 442. The command logic 428 may respond by returning a controller data structure (e.g., an Identify I/O Command Set specific controller data structure) that the host 402 may examine to determine the program types and/or formats that may be supported by the computational device 426. The host 402 may then issue a Get Log Page command 446. The command logic 428 may respond by sending the Get Program Slot Information Log Page which the host 402 may examine to determine which, if any, of the program slots 416 are available.

If a program slot 416 is available, the host 402 may issue a Load Program command 448 specifying an empty slot and passing an executable program 420 (e.g., a filtering program, decrypting program, and/or the like) as command data. In this example, the host 402 may specify Slot 0. Command logic 428 may receive the program 420 and load it into Slot 0 (416a). In some embodiments, the command logic 428 may then send a Load Program Success message to the host 402.

To execute the program 420, the host 402 may issue an Execute Program command 450 to the command logic 428. In response to the Execute Program command 450, the command logic 428 may use the programming interface 436 to access a kernel of an operating system running on one or more computational resources of the computational module 430. For example, the command logic 428 may write to one or more kernel buckets to provide information such as the program slot number, a number of arguments, any number of arguments (including zero), and/or the like, to the kernel as shown by arrow 451. In response to a write to one or more kernel buckets, the kernel may load the executable program from the specified slot (in this example, slot 0) into one or more compute engines in the computational module 430, start the program (which may also be referred to as invoking and/or launching the program) while passing any arguments that may have been written to the one or more buckets to the program. In some embodiments, the program may be run in a user space of an operating system. In some embodiments, the Identify Controller command 444, Get Log Page command 446, Load Program command 448, and/or Execute Program command 450 may be implemented, for example, as NVMe commands.

Figure 5:
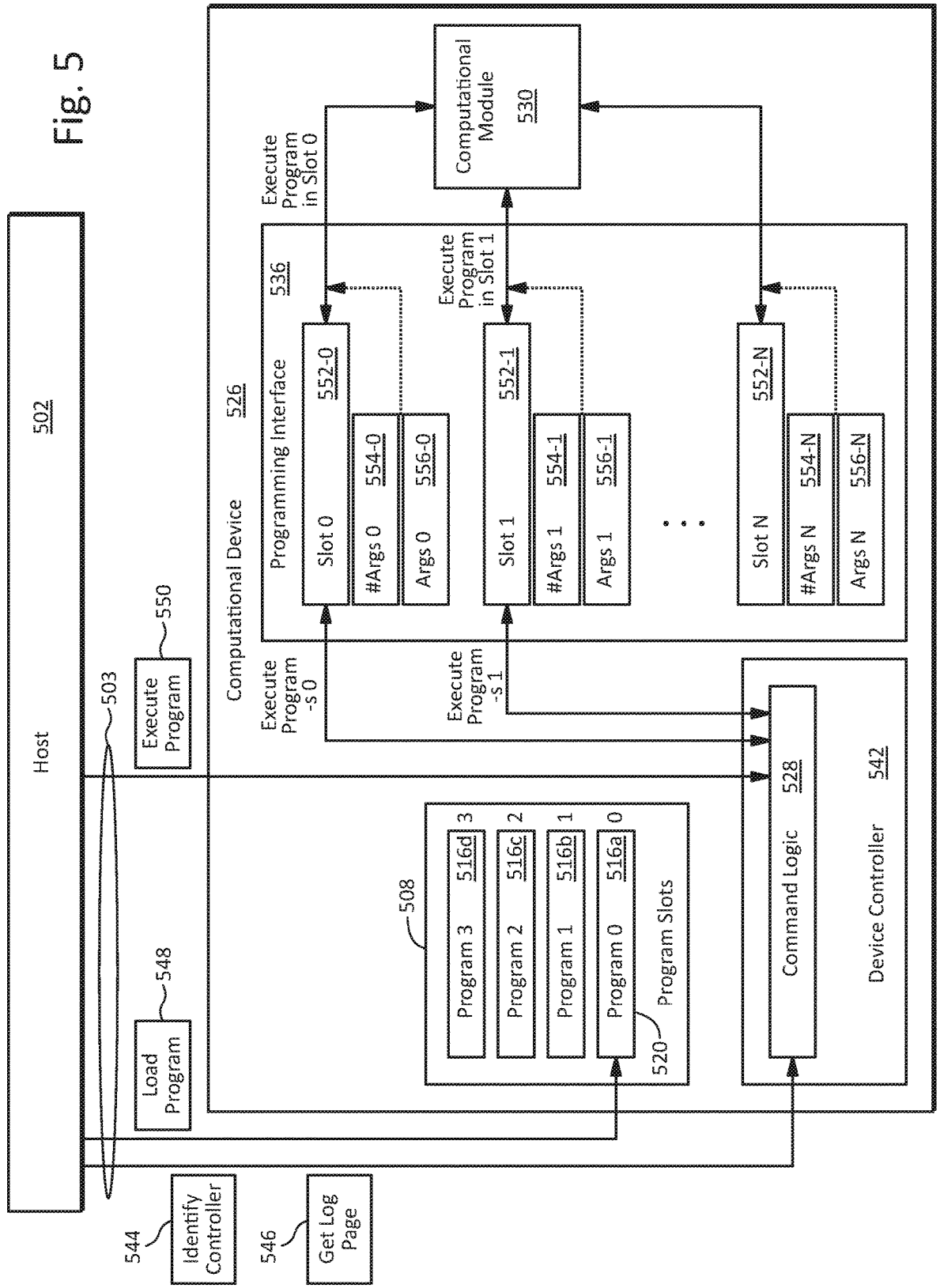
FIG. 5 illustrates an embodiment of a system having a computational device, and some example implementation details for a programming interface for the computational device, in accordance with example embodiments of the disclosure.

FIG. 5 illustrates an embodiment of a system having a computational device, and some example implementation details for a programming interface for the computational device, in accordance with example embodiments of the disclosure. The embodiment illustrated in FIG. 5 may be used to implement, or may be implemented by, for example, any of the embodiments disclosed herein, including those illustrated in FIG. 1, FIG. 2, FIG. 3, and/or FIG. 4 and may include some components similar to those illustrated in FIG. 1, FIG. 2, FIG. 3, and/or FIG. 4 where elements having reference numerals ending in the same digits may be similar.

In the embodiment illustrated in FIG. 5, a programming interface 536 may include one or more sets of one or more buckets (which may also be referred to as kernel buckets or virtual kernel buckets), wherein each set may correspond to a slot 516 of a program memory area 508. The number of sets of buckets may be N, where N may correspond to the number of program slots 516. (In this example, N may be equal to four.) In the example illustrated in FIG. 5, a first set of buckets corresponding to program Slot 0 may include a slot number bucket 552-0 (which may also be referred to as a Slot ID bucket), a number of arguments bucket 554-0, and an arguments bucket 556-0. The programming interface 536 may also include one or more additional sets of buckets 552-1, 554-1, and 556-1 through 552-N, 554-N, and 556-N.

Alternatively, a single set of buckets may be used, and a slot number may be written to one of the buckets to indicate which slot the single set of buckets may be associated with.

In some embodiments, one or more buckets may be implemented with one or more files, one or more portions of files, or any combination thereof, located in one or more specific directories in the operating system running on the computational module. In some embodiments, one or more specific buckets may be used for starting a program, one or more specific buckets may be used for debugging, one or more specific buckets may be used for profiling, and/or the like. In some embodiments, the buckets may alternatively, or additionally, be implemented as memory locations, or in any other manner in which information (e.g., parameters) may be passed between the command logic 528 and a kernel of the operating system running on the computational module 530.

In the embodiment illustrated in FIG. 5, one or more programs may be downloaded using an Identify Controller command 544, a Get Log Page command 546, and a Load Program command 548 for each program in a manner similar to that described above with respect to FIG. 4. In some embodiments, the commands may be implemented as NVMe commands, but any other protocol may be used.

To execute a program stored in a slot, the host 502 may send an Execute Program command 550 to the command logic 528. The Execute Program command 528 may include one or more parameters such as a slot number of the program to be executed, a number of arguments, and/or one or more arguments. The command logic 528 may initiate the program execution by writing to one or more of the buckets associated with a program slot. In some embodiments, the command logic 528 may pass one or more parameters received with the Execute Program command 528 to one or more of the buckets.

For example, in some embodiments, to execute a program in Slot 0, the command logic 528 may write the slot number 0 to slot number bucket 552-0, a number representing the number of arguments passed with the Execute Program command into the number of arguments bucket 554-0, and the actual arguments (if any) into the arguments bucket 556-0. As another example, to execute a program in Slot 1, the command logic 528 may write the slot number 1 to the slot number bucket 552-1, a number representing the number of arguments passed with the Execute Program command into the number of arguments bucket 554-1, and the actual arguments (if any) into an arguments bucket 556-1. (Alternatively, rather than writing the slot number to the corresponding slot number bucket (e.g., slot number 0 to slot number bucket 552-0), the command logic 528 may write any specific pattern such as the number 1 to the slot number bucket.) In response to the command logic 528 writing to the one or more buckets, a kernel running on the computation module 530 may load the executable program from the specified slot into one or more compute engines in the computational module 530, and start the program while passing any arguments that may have been written to the one or more buckets to the program. In some embodiments, writing to one or more of the buckets may trigger a kernel or system function call that may perform one or more operations requested by writing to the bucket (e.g., starting a program). In some embodiments, the one or more buckets may be accessible in user space (e.g., outside of kernel space so a user may access one or more buckets without accessing the kernel).

In some embodiments, the programming interface 536 illustrated in FIG. 5 may also be used to read data from the computational module 530, and therefore, one or more of the buckets may be implemented as bidirectional buckets. In some embodiments, one or more buckets may be unidirectional, bidirectional, and/or any combination thereof. Thus, whereas writing to a bucket may trigger a kernel or system function call to process an Execute Program command, read from a bucket may trigger a kernel or system function call that may cause the kernel to export information back through the programming interface 536 (e.g., into a user space). For example, reading from a slot number bucket may trigger a show command function that may cause the kernel to return (e.g., through the slot number bucket) information relating to the types of commands, operations, computational resources, and/or the like, supported by the computational module 530.

Figure 6:
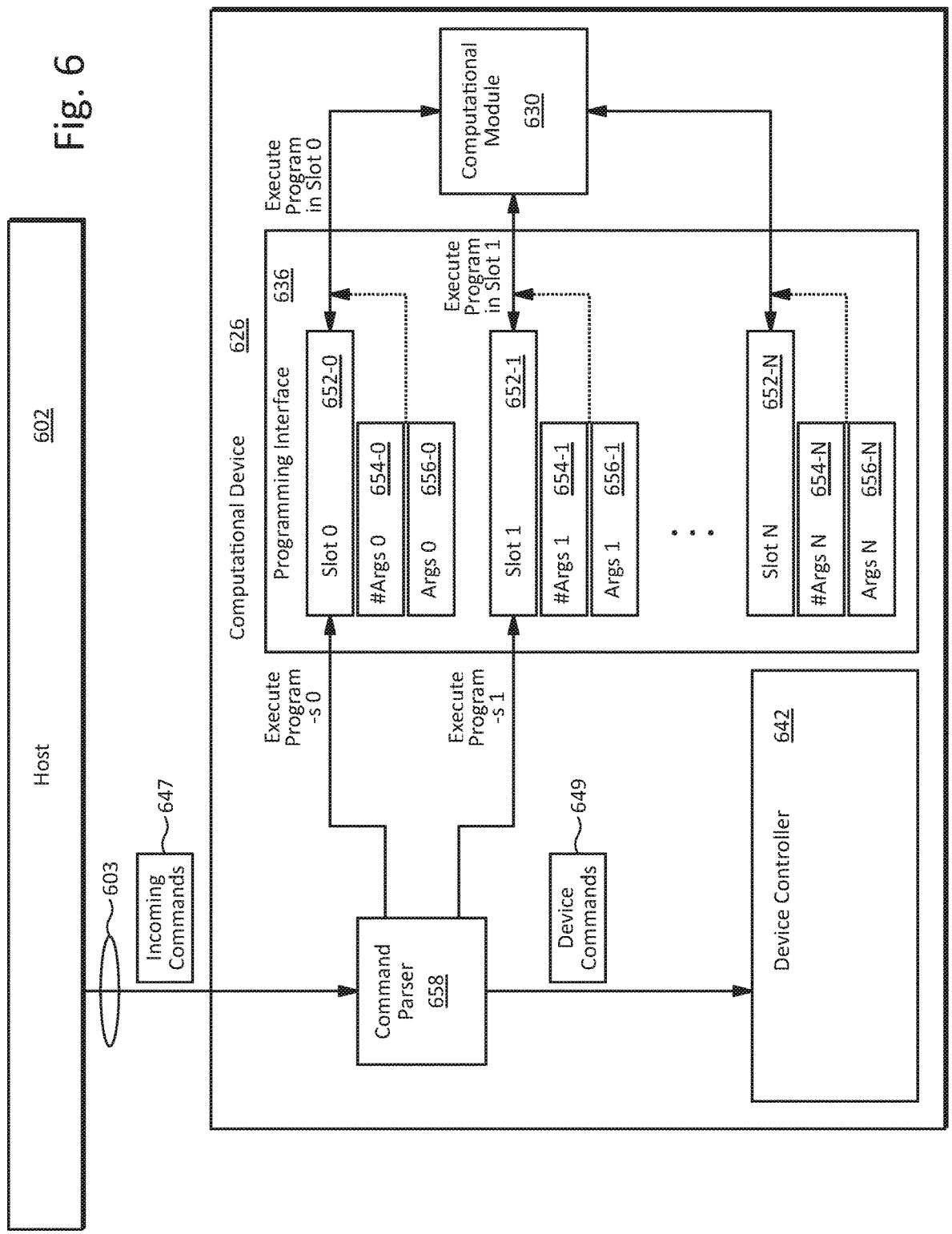
FIG. 6 illustrates an embodiment of a system having a computational device with a command parser and kernel that may be accessed using a programming interface in accordance with example embodiments of the disclosure.

FIG. 6 illustrates an embodiment of a system having a computational device with a command parser and kernel that may be accessed using a programming interface in accordance with example embodiments of the disclosure. The embodiment illustrated in FIG. 6 may include some components similar to those illustrated in FIG. 5 and indicated by reference numerals ending in the same digits. However, in the embodiment illustrated in FIG. 6, some or all of the command logic may be implemented as a command parser 658.

The command parser 658 may be used, for example, to offload one or more command processing tasks from the device controller 642. In some embodiments, the command parser 658 may check each incoming command 647 received from the host 602 and reroute the command based on the command type, destination, and/or the like. For example, if the command is a device command 649 related to the primary function of the computational device 626 (e.g., a storage command related to a storage device, a graphics command related to a GPU, and/or the like), the command parser 658 may pass the command through to the device controller 642. If, however, the command is related to the operation of the computational module 630, the command parser 658 may reroute the command to the application interface 636, for example, by writing the command and/or one or more parameters accompanying the command to one or more of the buckets of the application interface 636.

In some embodiments, and depending on the implementation details, the command parser 658 may reduce the processing burden on the device controller 642 which, in turn, may free the device controller 642 to perform other tasks (e.g., tasks the device controller 642 may perform more efficiently).

As with any of the other components disclosed herein, the command parser 658 may be implemented with hardware, software, firmware or a combination thereof including combinational logic, sequential logic, one or more timers, counters, registers, and/or state machines, one or more CPLDs, FPGAs, ASICs, CPUs, GPUs, NPUs, TPUs, and/or the like, executing instructions stored in any type of memory, or any combination thereof. In some embodiments, the command parser 658 may be implemented as part of a controller (e.g., a protocol controller such as an NVMe controller).

Figure 7:
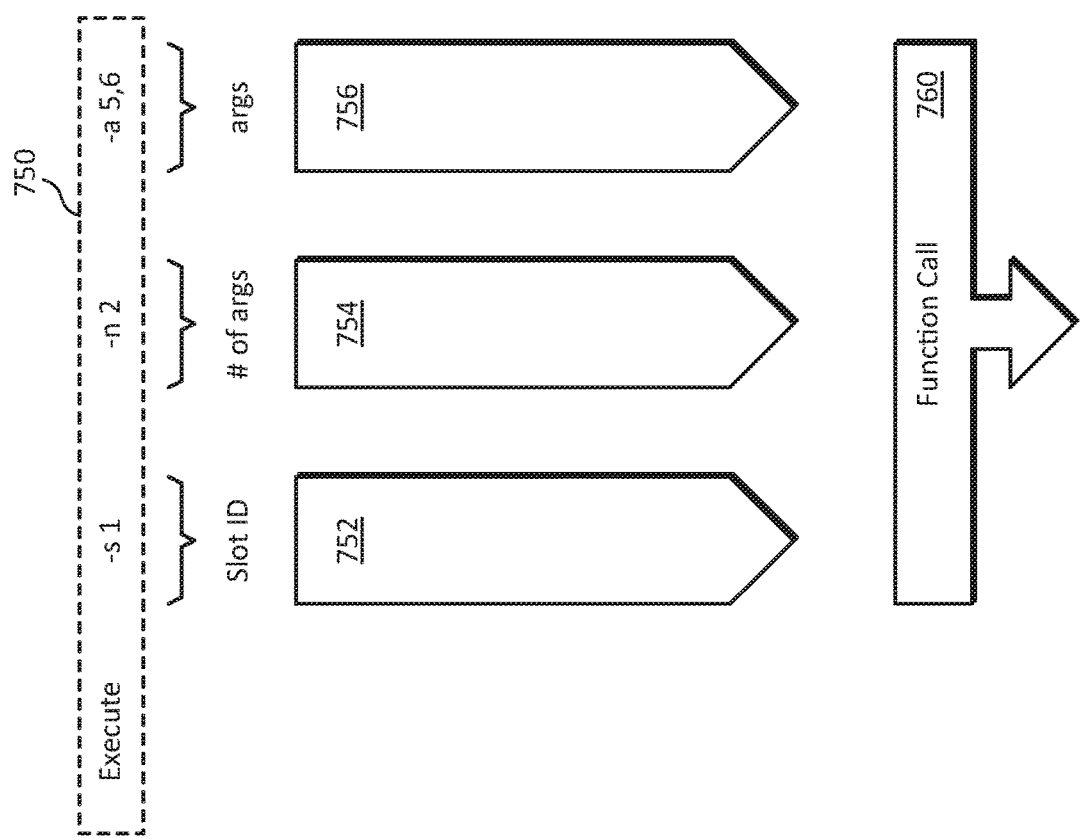
FIG. 7 illustrates an example embodiment of a programming interface scheme in accordance with example embodiments of the disclosure.

FIG. 7 illustrates an example embodiment of a programming interface scheme in accordance with example embodiments of the disclosure. The embodiment illustrated in FIG. 7 may be used, for example, to implement any of the programming interfaces disclosed herein, including those illustrated in FIG. 3, FIG. 4, FIG. 5, and/or FIG. 6. For purposes of illustration, the embodiment illustrated in FIG. 7 may be described in a context using a single compute engine, but the principles may be applied to embodiments using any number of compute engines.

The embodiment illustrated in FIG. 7 may include a first kernel bucket (e.g., a kernel virtual object) 752 configured to receive a program slot identifier (Slot ID, which may also be referred to as a slot number), a second kernel bucket 754 configured to receive a number of arguments associated with a program stored in the slot indicated by the Slot ID, and a third kernel bucket 756 configured to receive any number of arguments (including zero).

A method for implementing a program flow using the kernel buckets 752, 754, and/or 756 may proceed as follows. Prior to the program flow, one or more programs (e.g., executable binaries) may be loaded into one or more program slots and ready to execute, and a mapping may be established between the one or more programs and the one or more program slots in a program memory area.

The program flow may begin when an Execute command 750 (e.g., an NVMe Program Execute command) is received (e.g., by command logic). The Execute command may include one or more parameters such as -s, -n, and/or -a which may be defined as follows:
- -s: Slot ID which may indicate a slot in which an executable program is stored;
- -n: a number of arguments used by the program in the indicated Slot ID; and
- -a: any number of arguments (including zero) to be passed to the program.

In the example illustrated in FIG. 7, the parameter -s may have the value 1, the parameter -n may have the value 2, and the parameter -a may have the values 5, 6 as shown in FIG. 7.

In response to receiving the Execute command 750, the values of the parameters -s, -n, and -a may be written (e.g., by command logic) to the kernel buckets 752, 754, and 756, respectively. The writing of the one or more parameters to one or more kernel buckets may trigger a kernel or system function call (e.g., an Execute Program command function) that may cause the kernel to perform a requested operation (e.g., launch the program indicated by the Slot ID with arguments provided in the bucket 756, if any) as shown by operation 760.

In some embodiments, reading from one or more of the kernel buckets 752, 754, and/or 756 (e.g., by command logic) may trigger a kernel or system function call (e.g., a Show Command function) that may cause the kernel to export information (e.g., a list of supported commands, parameters, and/or the like) from the kernel to a user space.

Figure 8:
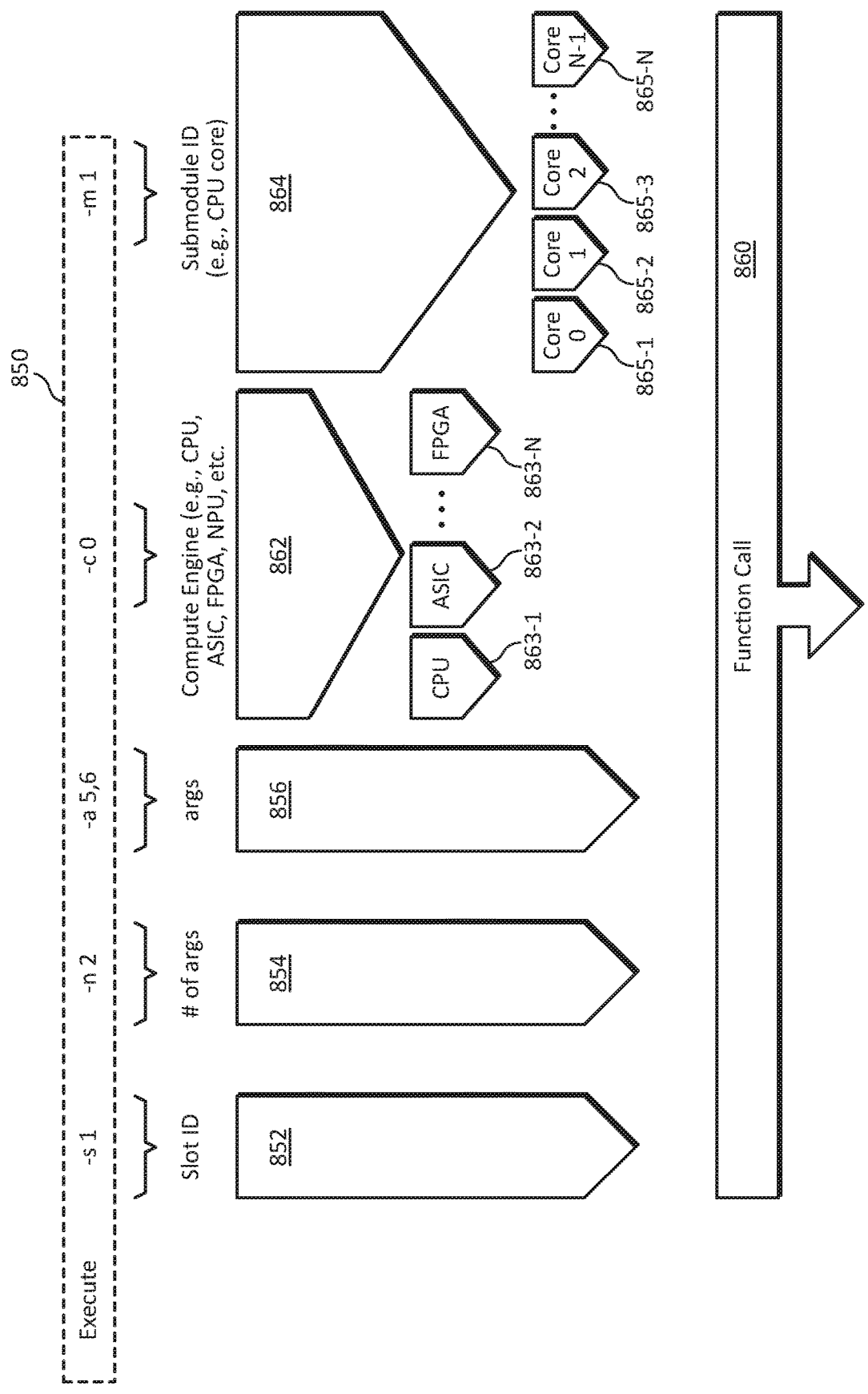
FIG. 8 illustrates an example embodiment of a programming interface scheme for a computational module having multiple compute engines and/or subcomponents thereof in accordance with example embodiments of the disclosure.

FIG. 8 illustrates an example embodiment of a programming interface scheme for a computational module having multiple compute engines and/or subcomponents thereof in accordance with example embodiments of the disclosure. The embodiment illustrated in FIG. 8 may be used, for example, to implement any of the programming interfaces disclosed herein, including those illustrated in FIG. 3, FIG. 4, FIG. 5, FIG. 6, and/or FIG. 7.

The embodiment illustrated in FIG. 8 may include a first kernel bucket (e.g., a kernel virtual object) 852 configured to receive a program slot identifier (Slot ID, which may also be referred to as a slot number), a second kernel bucket 854 configured to receive a number of arguments associated with a program stored in the slot indicated by the Slot ID, and a third kernel bucket 856 configured to receive any number of arguments (including zero).

The embodiment illustrated in FIG. 8 may further include a fourth kernel bucket (e.g., a kernel virtual object) 862 configured to receive a compute engine number (also referred to as a compute engine ID), and/or a fifth kernel bucket 864 configured to receive a subcomponent identifier (ID).

In some embodiments, the compute engine ID may indicate which of one or more compute engines the kernel may use to perform an operation (e.g., running a program) requested by writing to the one or more kernel buckets. In the example embodiment illustrated in FIG. 8, the compute engine ID may indicate one or more of a CPU compute engine 863-1, an ASIC compute engine 863, and/or any other compute engines up to and including FPGA compute engine 863-N may be used to perform the requested operation. In other embodiments, any number and/or types of compute engines 863 may be used.

In some embodiments, the subcomponent ID may indicate which of one or more subcomponents of a selected compute engine the kernel may use to perform an operation (e.g., running a program) requested by writing to the one or more kernel buckets. For example, if a CPU 863-1 is selected as a compute engine, the subcomponent ID may indicate which of one or more CPU cores 865-1, 865-2, . . . , 865-N of the selected CPU may be used to perform an operation (e.g., running a program) requested by writing to the one or more kernel buckets.

A method for implementing a program flow using the kernel buckets 852, 854, 856, 862, and/or 864 may proceed as follows. Prior to the program flow, one or more programs (e.g., executable binaries) may be loaded into one or more program slots and ready to execute, and a mapping may be established between the one or more programs and the one or more program slots in a program memory area.

The program flow may begin when an Execute command 850 (e.g., an NVMe Program Execute command) is received (e.g., by command logic). The Execute command may include one or more parameters such as -s, -n, -a, -c, and/or -m which may be defined as follows:
- -s: Slot ID which may indicate a slot in which an executable program is stored;
- -n: a number of arguments used by the program in the indicated Slot ID;
- -a: any number of arguments (including zero) to be passed to the program;
- -c: one or more compute engine IDs which may indicate one or more compute engines that may be used to execute the program in the selected slot; and
- -m: one or more subcomponents (e.g., processor cores, ASIC submodules, and/or the like) of the one or more compute engines selected by the -c parameter that may be used to execute the program in the selected slot.

In the example illustrated in FIG. 8, the parameter -s may have the value 1 (which may indicate Slot 1), the parameter -n may have the value 2, the parameter -a may have the values 5, 6, the parameter -c may have the value 0 (which may indicate the CPU 863-1), and the parameter -m may have the value 1 (which may indicate the CPU core 865-2) as shown in FIG. 8.

In response to receiving the Execute command 850, the values of the parameters -s, -n, -a, -c, and/or -m may be written (e.g., by command logic) to the kernel buckets 852, 854, 856, 862, and/or 864, respectively. The writing of the one or more parameters to one or more kernel buckets may trigger a kernel or system function call (e.g., an Execute Program command function) that may cause the kernel to perform a requested operation (e.g., launch the program indicated by the Slot ID with arguments provided in the bucket 856, if any), using a specific compute engine (e.g., CPU 863-1) and/or subcomponent (e.g., CPU core 865-1) as shown by operation 860.

In some embodiments, reading from one or more of the kernel buckets 852, 854, 856, 862, and/or 864 (e.g., by command logic) may trigger a kernel or system function call (e.g., a Show Command function) that may cause the kernel to export information (e.g., a list of supported commands, parameters, and/or the like) from the kernel to a user space.

In some embodiments, the scheme illustrated in FIG. 8 may be implemented, for example, by extending the scheme illustrated in FIG. 7. Depending on the implementation details, the embodiments illustrated in FIG. 7 and FIG. 8 may provide a generic interface that may implement a wide range of features using a wide range of devices. For example, in some embodiments, tying a program to a specific CPU and/or CPU core (which may be referred to as a CPU affinity feature) may enable a host to control mapping from one or more programs, to one or more slots, to one or more computational units (e.g., compute engines and/or one or more subcomponents thereof). Depending on the implementation details, this may enable debugging, tracing, profiling, and/or the like a program, for example, because it may enable a user to know which compute engine(s) and/or subcomponent(s) thereof, a program is running on. Moreover, depending on the implementation details, this may enable a user to control where the results of an operation (e.g., program execution) may be managed and/or stored.

Figure 9:
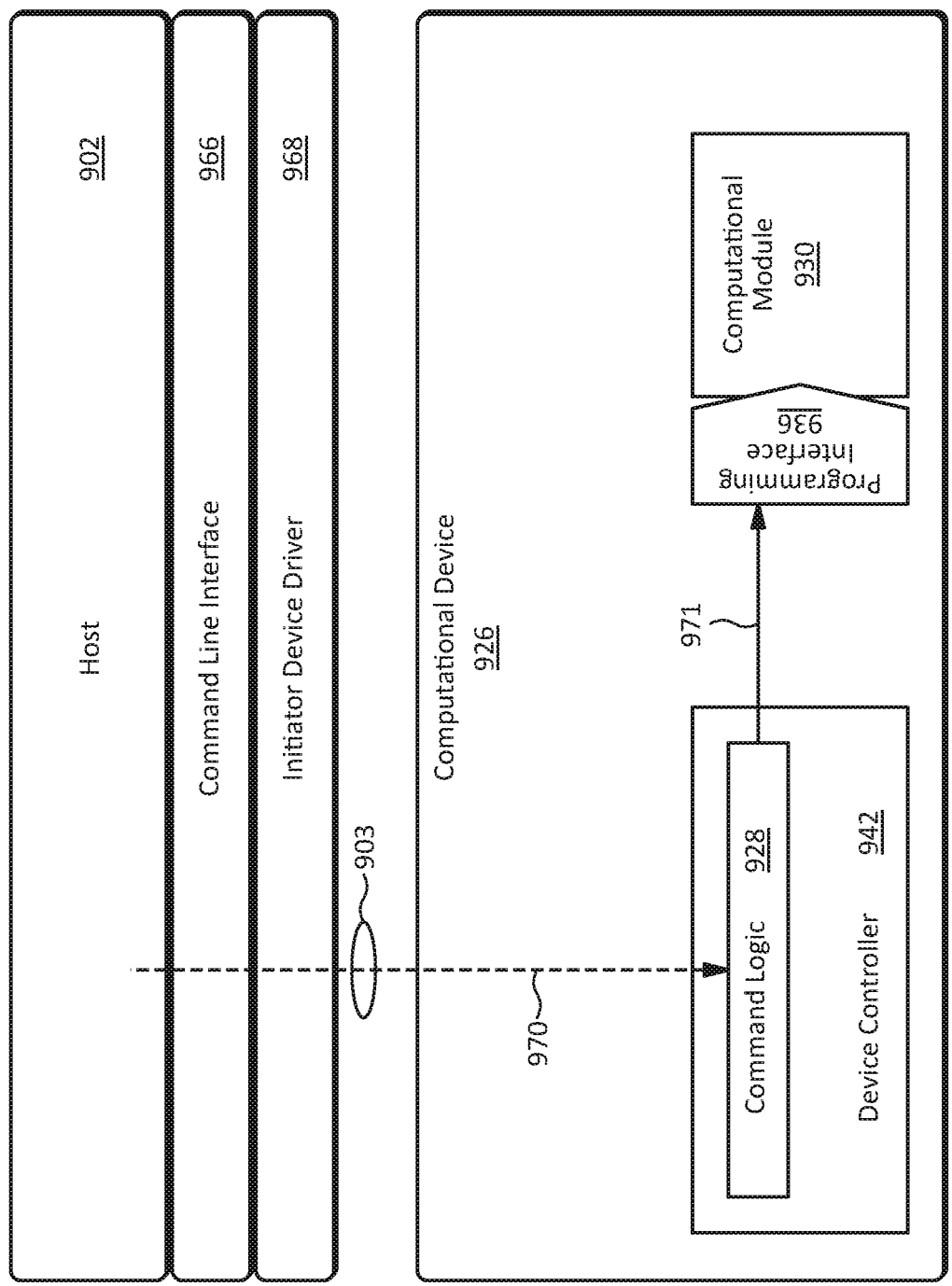
FIG. 9 illustrates a first example embodiment of a scheme for communicating between a host and a computational device in accordance with example embodiments of the disclosure.

FIG. 9 illustrates a first example embodiment of a scheme for communicating between a host and a computational device in accordance with example embodiments of the disclosure. The embodiment illustrated in FIG. 9 may be used to implement, or may be implemented with any of the embodiments disclosed herein including, for example, those illustrated in FIG. 3, FIG. 4, FIG. 5, FIG. 6, FIG. 7, and/or FIG. 8. The embodiment illustrated in FIG. 9 may include components similar to those illustrated in FIG. 3, FIG. 4, FIG. 5, and/or FIG. 6, and elements having reference numerals ending in the same digits may be similar.

The embodiment illustrated in FIG. 9 may include a host 902, a command line interface (CLI) 966 (e.g., an NVMe CLI), an initiator device driver 968 (e.g., an NVMe initiator device driver), and a computational device 926 communicating with the host 902 through a communication connection 903. In some embodiments, the command line interface 966, and/or initiator device driver 968 may be implemented with the same hardware as the host 902. The computational device 926 may include a device controller 942 with integral command logic 928 and a computational module 930 having one or more compute resources running an operating system with a kernel that may implement a programming interface 936.

In some embodiments, a command flow shown as path 970 may proceed as follows: (1) a user may send a command using the command line interface 966 which may pass the command to the initiator device driver 968; (2) the initiator device driver 968 may send the command through the connection 903 to the command logic 928 which may be implemented, for example, with firmware running on the device controller 942; (3) the command logic 928 may forward the command to programming interface 936 (e.g., by writing to one or more kernel buckets) as shown by path 971; and (4) the programming interface 936 may pass the command to the kernel of the operating system running on the computational module 930.

In some embodiments, the command path 970 may also operate in reverse to export information from the computational module 930 to the host 902. Although not limited to any specific application, the embodiment illustrated in FIG. 9 may be used, for example, with a computational device implemented with a storage device, wherein the device controller 942 may be implemented as a storage device controller.

Figure 10:
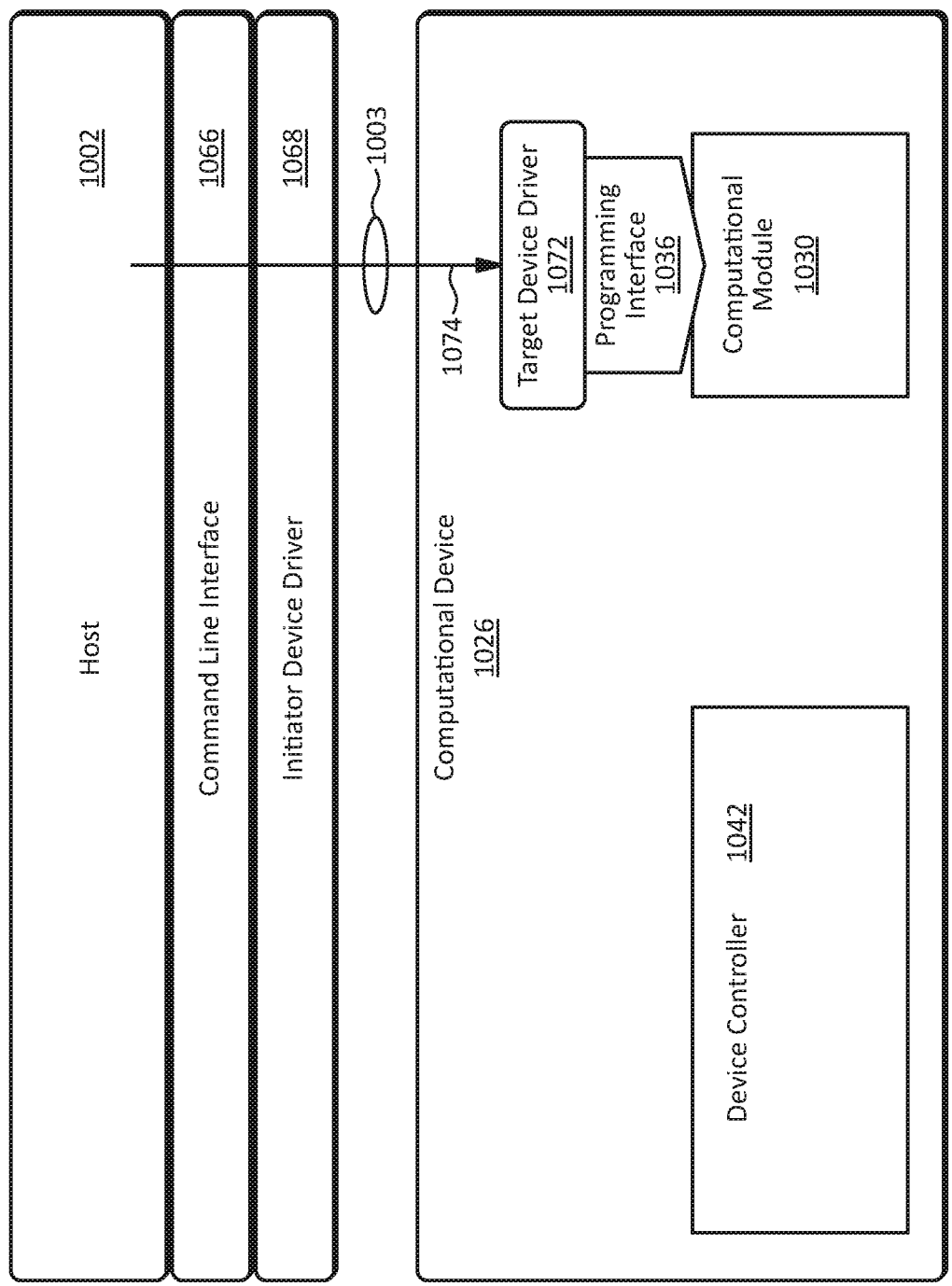
FIG. 10 illustrates a second example embodiment of a scheme for communicating between a host and a computational device in accordance with example embodiments of the disclosure.

FIG. 10 illustrates a second example embodiment of a scheme for communicating between a host and a computational device in accordance with example embodiments of the disclosure. The embodiment illustrated in FIG. 10 may be used to implement, or may be implemented with, any of the embodiments disclosed herein including, for example, those illustrated in FIG. 3, FIG. 4, FIG. 5, FIG. 6, FIG. 7, and/or FIG. 8. The embodiment illustrated in FIG. 10 may include components similar to those illustrated in FIG. 9, and elements having reference numerals ending in the same digits may be similar.

In the embodiment illustrated in FIG. 10, a computational module 1030 having one or more compute resources may run an operating system with a kernel that may implement a programming interface 1036 and a target device driver 1072 (e.g., an NVMe target device driver).

In some embodiments, a command flow shown as path 1074 may proceed as follows: (1) a user may send a command using the command line interface 1066 which may pass the command to an initiator device driver 1068; (2) the initiator device driver 1068 may send the command through a connection 1003 to the target device driver 1072 running on the computational module 1030; (3) the target device driver 1072 may forward the command to programming interface 1036 (e.g., by writing to one or more kernel buckets); and (4) the programming interface 1036 may pass the command to the kernel of the operating system running on the computational module 1030.

In some embodiments, the command path 1074 may also operate in reverse to export information from the computational module 1030 to the host 1002. Although not limited to any specific application, the embodiment illustrated in FIG. 10 may be used, for example, with a computational device implemented with an accelerator, wherein the target device driver 1072 and/or computational module 1030 may be implemented with the primary computational resources of the accelerator.

In some embodiments, the computational module 1030 may be accessed directly (e.g., using a secure shell (ssh) command using a terminal that may run directly on the computational module 1030. To provide compatibility with an embodiment that may use a protocol (e.g., NVMe) such as that illustrated in FIG. 9, the scheme illustrated in FIG. 10 may emulate the scheme illustrated in FIG. 9, for example, by passing commands (e.g., NVMe commands) through the initiator device driver 1068, a network or interconnect fabric 1003, and through the target device driver 1072.

Figure 11:
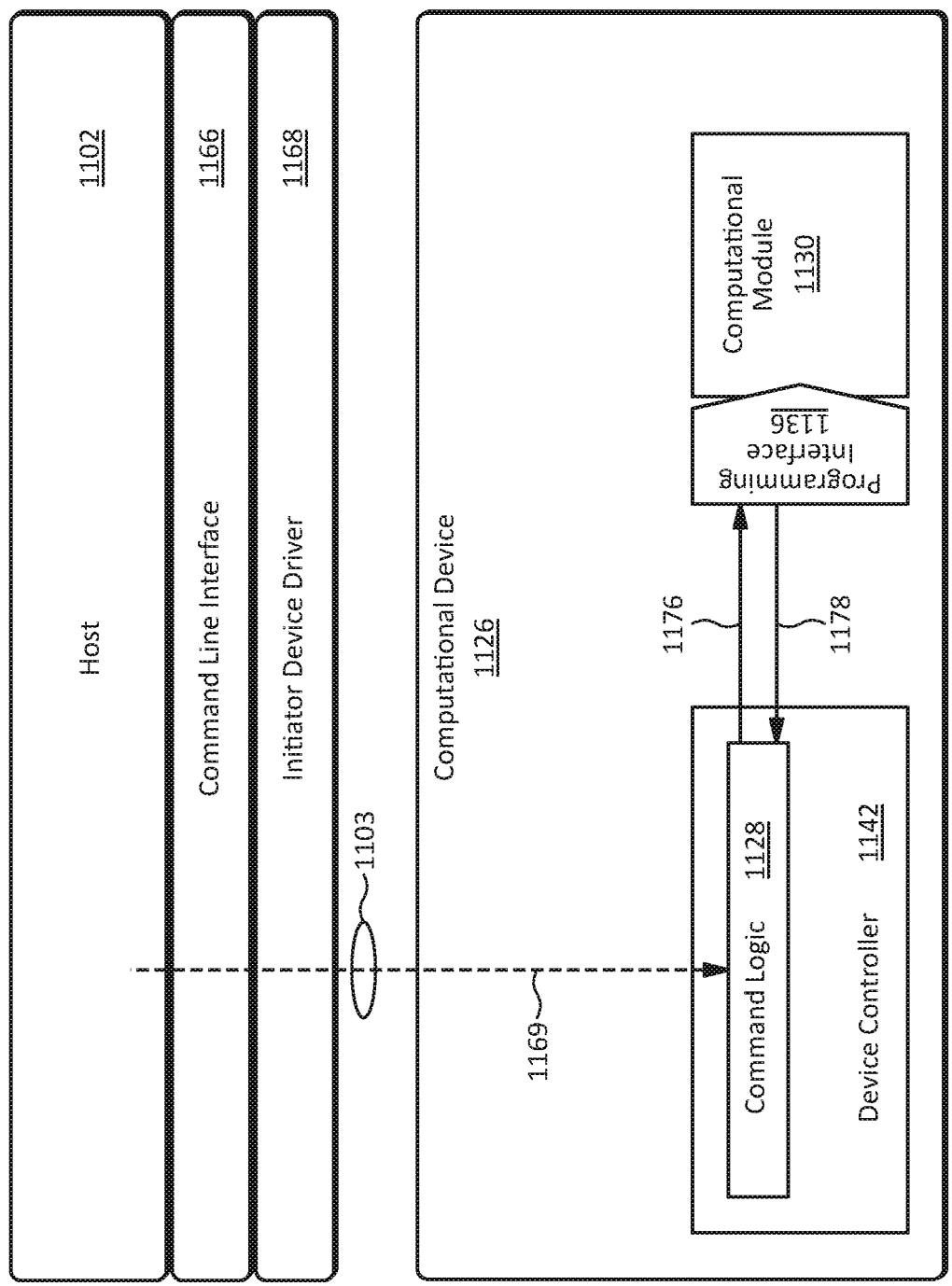
FIG. 11 illustrates a third example embodiment of a scheme for communicating between a host and a computational device in accordance with example embodiments of the disclosure.

FIG. 11 illustrates a third example embodiment of a scheme for communicating between a host and a computational device in accordance with example embodiments of the disclosure. The embodiment illustrated in FIG. 11 may be used to implement, or may be implemented with, any of the embodiments disclosed herein including, for example, those illustrated in FIG. 3, FIG. 4, FIG. 5, FIG. 6, FIG. 7, and/or FIG. 8. The embodiment illustrated in FIG. 11 may include components similar to those illustrated in FIG. 9, and elements having reference numerals ending in the same digits may be similar.

In the embodiment illustrated in FIG. 11, an information flow shown as path 1169 may proceed as follows: (1) a user may send a Slot ID (which may be accompanied by one or more additional parameters) using a command line interface 1166 which may pass the Slot ID to an initiator device driver 1168; (2) the initiator device driver 1168 may send the Slot ID 1169 through a connection 1103 to command logic 1128 which may be implemented, for example, with firmware running on a device controller 1142; (3) the command logic 1128 may forward the Slot ID to programming interface 1136 (e.g., by writing to one or more kernel buckets) as shown by path 1176; and (4) the programming interface 1136 may pass the command to the kernel of the operating system running on the computational module 1130.

In some embodiments, the information flow 1170 may operate in reverse, for example, by command logic 1128 accessing a Slot ID (e.g., by reading a kernel bucket) through the programming interface 1136 as shown by path 1178. In some embodiments, this may trigger a function call that may export information from the computational module 1130 back to the host 1102.

Depending on the implementation details, the embodiment illustrated in FIG. 11 may enable a user to access a kernel of an operating system running on the computational module 1130 without involving a conversion of a command (e.g., an NVMe execute command, load command, and/or the like) to a read and/or write (e.g., an NVMe read and/or write) which may be a relatively expensive conversion in terms of time, power, bandwidth, latency, complexity, and/or the like. Depending on the implementation details, the embodiment illustrated in FIG. 11 may enable a user to access a kernel of an operating system running on the computational module 1130 with little or no degradation of performance. In some embodiments, the scheme illustrated in FIG. 11 may be configured to trigger (e.g., directly trigger) one or more programs for execution on the computational module 1130 while freeing the device controller 1142 to perform other operations.

Figure 12:
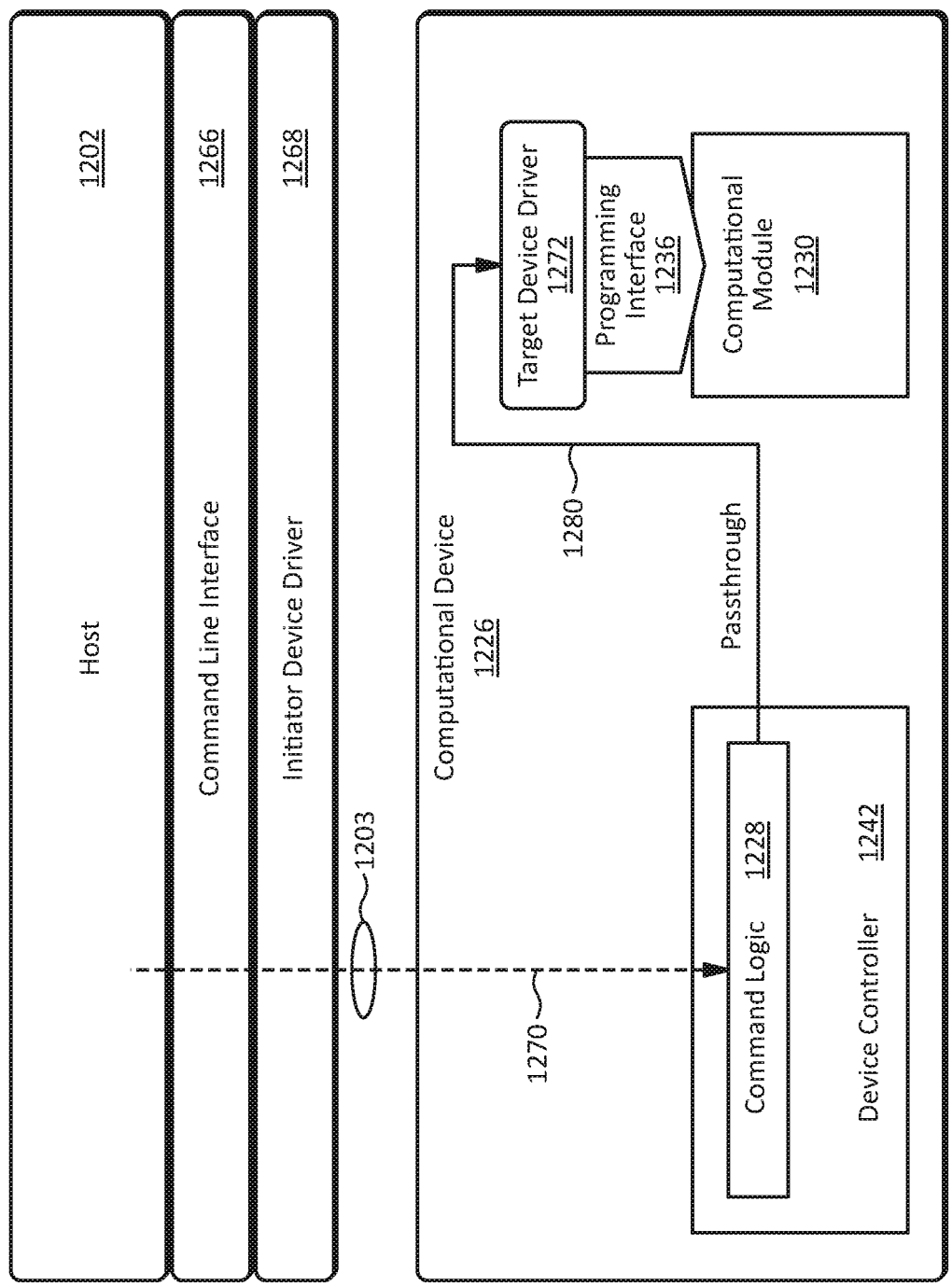
FIG. 12 illustrates a fourth example embodiment of a scheme for communicating between a host and a computational device in accordance with example embodiments of the disclosure.

FIG. 12 illustrates a fourth example embodiment of a scheme for communicating between a host and a computational device in accordance with example embodiments of the disclosure. The embodiment illustrated in FIG. 12 may be used to implement, or may be implemented with, any of the embodiments disclosed herein including, for example, those illustrated in FIG. 3, FIG. 4, FIG. 5, FIG. 6, FIG. 7, and/or FIG. 8. The embodiment illustrated in FIG. 12 may include components similar to those illustrated in FIG. 9, FIG. 10, and/or FIG. 11, and elements having reference numerals ending in the same digits may be similar. However, in the embodiment illustrated in FIG. 12, a passthrough path 1280 may connect the command logic 1228 with a target device driver 1272 for an operating system running on one or more compute resources in a computational module 1230.

In some embodiments, a command flow shown as paths 1270 and 1280 may proceed as follows: (1) a user may send a command using the command line interface 1266 which may pass the command to an initiator device driver 1268; (2) the initiator device driver 1268 may send the command through a connection 1203 to command logic 1228 which may be implemented, for example, with firmware running on a device controller 1242; (3) if the command is not intended for the device controller 1242 (e.g., the command is not a storage command for a storage device), the command logic 1228 may pass the command through to a target device driver 1272 running on a computational module 1230 as shown by path 1280; (4) the target device driver 1272 may forward the command to programming interface 1236 (e.g., by writing to one or more kernel buckets); and (5) the programming interface 1236 may pass the command to the kernel of an operating system running on the computational module 1230.

In some embodiments, the command flow 1270 may operate in reverse, for example, by command logic 1228 accessing the kernel (e.g., by reading a kernel bucket) through the programming interface 1236. In some embodiments, this may trigger a function call that may export information from the computational module 1230 back to the host 1202.

Depending on the implementation details, the embodiment illustrated in FIG. 12 may enable a user to access a kernel of an operating system running on the computational module 1230 without involving a conversion of a command (e.g., an NVMe execute command, load command, and/or the like) to a read and/or write (e.g., an NVMe read and/or write) which may be a relatively expensive conversion in terms of time, power, bandwidth, latency, complexity, and/or the like. Thus, instead of the command logic 1228 processing the command, the target device driver 1272 may process the command. Depending on the implementation details, the embodiment illustrated in FIG. 12 may enable a user to access a kernel of an operating system running on the computational module 1230 with little or no degradation of performance. In some embodiments, the scheme illustrated in FIG. 12 may be configured to offload the work of triggering one or more operations (e.g., programs) for execution on the computational module from the device controller 1242 to the target device driver 1272, thereby freeing the device controller 1242 to perform other operations.

Figure 13:
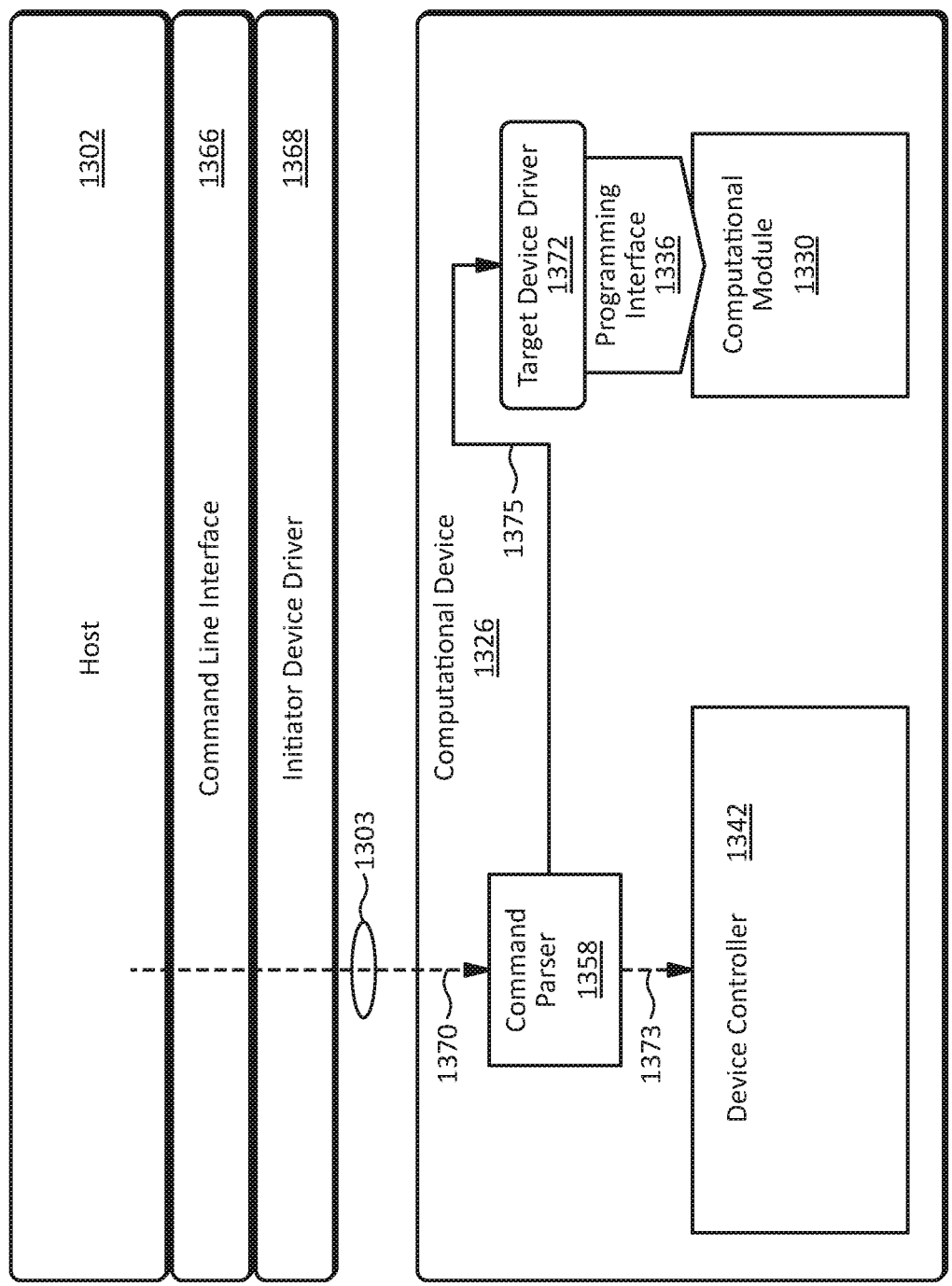
FIG. 13 illustrates a fifth example embodiment of a scheme for communicating between a host and a computational device in accordance with example embodiments of the disclosure.

FIG. 13 illustrates a fifth example embodiment of a scheme for communicating between a host and a computational device in accordance with example embodiments of the disclosure. The embodiment illustrated in FIG. 13 may be used to implement, or may be implemented with, any of the embodiments disclosed herein including, for example, those illustrated in FIG. 3, FIG. 4, FIG. 5, FIG. 6, FIG. 7, and/or FIG. 8. The embodiment illustrated in FIG. 13 may include components similar to those illustrated in FIG. 9, FIG. 10, FIG. 11, and/or FIG. 12, and elements having reference numerals ending in the same digits may be similar.

In the embodiment illustrated in FIG. 13, some or all of the command logic may be implemented as a command parser 1358. The command parser 1358 may be used, for example, to offload one or more command processing tasks from the device controller 1342. In some embodiments, the command parser 1358 may be implemented at least partially with firmware running on a device controller 1342. In some embodiments, the command parser 1358 may be implemented at least partially with one or more of the computational resources of the computational module 1330.

In some embodiments, a command flow shown as paths 1370, 1373, and/or 1375 may proceed as follows: (1) a user may send a command using the command line interface 1366 which may pass the command to an initiator device driver 1368; (2) the initiator device driver 1368 may send the command through a connection 1303 to the command parser 1358; (3) if the command is intended for the device controller 1342 (e.g., the command is a storage command for a storage device), the command parser 1358 may pass the command through to the device controller 1342 as shown by path 1373; (4) if, however, the command is intended for the computational module 1330, the command parser 1358 may pass the command to a target device driver 1372 running on the computational module 1330 as shown by path 1375; (5) the target device driver 1372 may forward the command to programming interface 1336 (e.g., by writing to one or more kernel buckets); and (6) the programming interface 1336 may pass the command to the kernel of an operating system running on the computational module 1330.

In some embodiments, the command flow may operate in reverse, for example, by command parser 1358 accessing the kernel (e.g., by reading a kernel bucket) through the programming interface 1336. In some embodiments, this may trigger a function call that may export information from the computational module 1330 back to the host 1302.

Depending on the implementation details, the embodiment illustrated in FIG. 13 may enable a user to access a kernel of an operating system running on the computational module 1330 without involving a conversion of a command (e.g., an NVMe execute command, load command, and/or the like) to a read and/or write (e.g., an NVMe read and/or write) which may be a relatively expensive conversion in terms of time, power, bandwidth, latency, complexity, and/or the like. Depending on the implementation details, the embodiment illustrated in FIG. 13 may enable a user to access a kernel of an operating system running on the computational module 1330 with little or no degradation of performance. In some embodiments, the scheme illustrated in FIG. 13 may be configured to offload the work of triggering one or more operations (e.g., programs) for execution on the computational module from the device controller 1342 to the command parser 1358 and/or the target device driver 1372, thereby freeing the device controller 1342 to perform other operations.

Table 1 illustrates an embodiment of a directory and file structure for implementing program slots in accordance with example embodiments of the disclosure. The embodiment illustrated in Table 1 may be used to implement any program slots disclosed herein including, for example, the program slots illustrated in FIG. 1, FIG. 2, FIG. 4, and/or FIG. 5. For purposes of illustration, Table 1 shows output in a Linux® based operating system, but any other operating system may be used.

Table 1 shows the output of the long listing command "ll" (on line 1) by a user with root privileges in a directory named "memory" with the "-R" option which lists the names of the files in the current directory and all subdirectories. The output shows four subdirectories named slot_0, slot_1, slot_2, and slot_3 (on lines 6, 7, 8, and 9, respectively), each of which may correspond to a program slot. The listing of files within the slot_0 subdirectory shows an executable binary program named prog_0 (on line 15) in which the asterisk indicates an executable file. The subdirectories for slot_1, slot_2, and slot_3 also show corresponding executable binary programs named prog_1, prog_2, and prog_3, respectively (on lines 21, 27, and 33, respectively).

TABLE 1

| 1  | root@localhost :~/memory# ll -R |
|----|----|
| 2  | . : |
| 3  | total 24 |
| 4  | drwxr-xr-x   6 root root  4096 Jul 16 16:56 ./ |
| 5  | drwx------  11 root root  4096 Jul 22 16:56 ../ |
| 6  | drwxr-xr-x   2 root root  4096 Jul 16 16:56 slot_0/ |
| 7  | drwxr-xr-x   2 root root  4096 Jul 16 16:56 slot_1/ |
| 8  | drwxr-xr-x   2 root root  4096 Jul 16 16:56 slot_2/ |
| 9  | drwxr-xr-x   2 root root  4096 Jul 16 16:56 slot_3/ |
| 10 | |
| 11 | ./slot_0: |
| 12 | total 28 |
| 13 | drwxr-xr-x   2 root root  4096 Jul 16 16:56 ./ |
| 14 | drwx------   6 root root  4096 Jul 16 16:56 ../ |
| 15 | -rwxr-xr-x   1 root root 13600 Jul 16 16:56 prog_0* |
| 16 | |
| 17 | ./slot_1: |
| 18 | total 28 |
| 19 | drwxr-xr-x   2 root root  4096 Jul 16 16:56 ./ |
| 20 | drwx------   6 root root  4096 Jul 16 16:56 ../ |
| 21 | -rwxr-xr-x   1 root root 13600 Jul 16 16:56 prog_1* |
| 22 | |
| 23 | ./slot_2: |
| 24 | total 28 |
| 25 | drwxr-xr-x   2 root root  4096 Jul 16 16:56 ./ |
| 26 | drwx------   6 root root  4096 Jul 16 16:56 ../ |
| 27 | -rwxr-xr-x   1 root root 13600 Jul 16 16:56 prog_2* |

TABLE 1-continued

| 28 | |
|----|----|
| 29 | ./slot_3: |
| 30 | total 28 |
| 31 | drwxr-xr-x   2 root root  4096 Jul 16 16:56 ./ |
| 32 | drwx------   6 root root  4096 Jul 16 16:56 ../ |
| 33 | -rwxr-xr-x   1 root root 13600 Jul 16 16:56 prog_3* |

Table 2 illustrates an embodiment of a file structure for implementing kernel buckets in accordance with example embodiments of the disclosure. The embodiment illustrated in Table 2 may be used to implement any kernel buckets disclosed herein including, for example, the kernel buckets illustrated in FIG. 7 and/or FIG. 8. For purposes of illustration, Table 2 shows output in a Linux® based operating system, but any other operating system may be used.

Table 2 shows the output of the long listing command "ll" (on line 1) by a user with root privileges in a directory named "APL_Module." The output shows four sets of files, each set including three files as follows. Files named slot_0, slot_0_n, and slot_0_args (on lines 6, 7, and 8, respectively) may correspond, for example, to an instance of buckets 752, 754, and 756, respectively, illustrated in FIG. 7. Similarly, files named slot_1, slot_1_n, and slot_1_args (on lines 6, 7, and 8, respectively) may correspond, for example, to another instance of buckets 752, 754, and 756, respectively, illustrated in FIG. 7. Thus, in some embodiments, the four sets of files illustrated in Table 2 may provide corresponding kernel buckets for the four program slots illustrated in Table 1. In some embodiments, one or more additional buckets may be used specifically for debugging, profiling, and/or the like.

TABLE 2

| 1  | root@localhost :~/API_Module# ll |
|----|----|
| 3  | total 0 |
| 4  | drwxr-xr-x   2 root root     0 Jul 16 16:56 ./ |
| 5  | drwxr-xr-x  16 root root     0 Jul 22 16:56 ../ |
| 6  | -rw-rw-r--   1 root root 4096 Jul 16 16:56 slot_0 |
| 7  | -rw-rw-r--   1 root root 4096 Jul 16 16:56 slot_0_n |
| 8  | -rw-rw-r--   1 root root 4096 Jul 16 16:56 slot_0_args |
| 9  | -rw-rw-r--   1 root root 4096 Jul 16 16:56 slot_1 |
| 10 | -rw-rw-r--   1 root root 4096 Jul 16 16:56 slot_1_n |
| 11 | -rw-rw-r--   1 root root 4096 Jul 16 16:56 slot_1_args |
| 12 | -rw-rw-r--   1 root root 4096 Jul 16 16:56 slot_2 |
| 13 | -rw-rw-r--   1 root root 4096 Jul 16 16:56 slot_2_n |
| 14 | -rw-rw-r--   1 root root 4096 Jul 16 16:56 slot_2_args |
| 15 | -rw-rw-r--   1 root root 4096 Jul 16 16:56 slot_3 |
| 16 | -rw-rw-r--   1 root root 4096 Jul 16 16:56 slot_3_n |
| 17 | -rw-rw-r--   1 root root 4096 Jul 16 16:56 slot_3_args |

Figure 14:
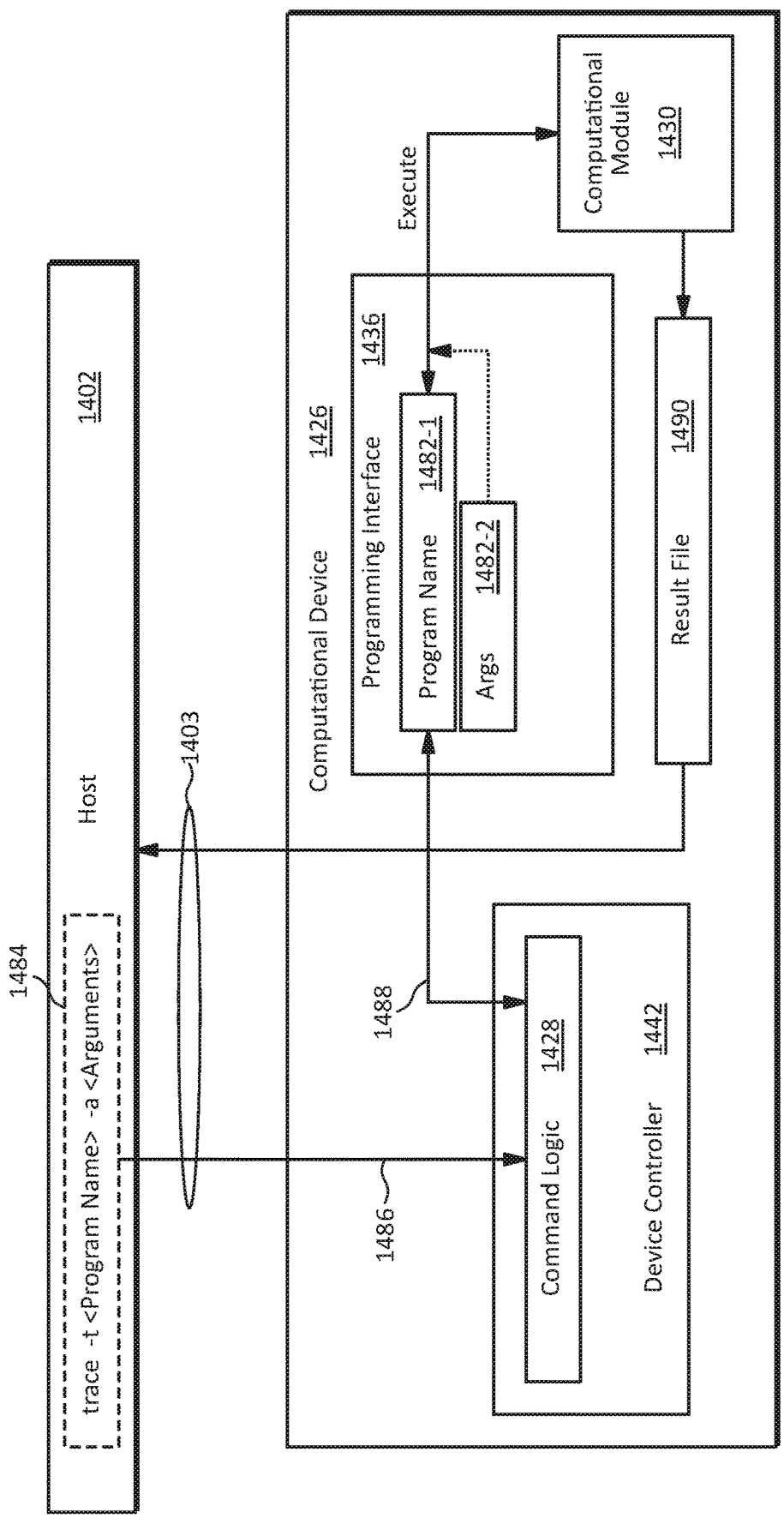
FIG. 14 illustrates an embodiment of a system having a computational device with a programming interface configured to run a program in accordance with example embodiments of the disclosure.

FIG. 14 illustrates an embodiment of a system having a computational device with a programming interface configured to run a program in accordance with example embodiments of the disclosure. The embodiment illustrated in FIG. 14 may include some components similar to those illustrated in FIG. 5 and FIG. 6 where elements indicated by reference numerals ending in the same digits may be similar. However, in the embodiment illustrated in FIG. 14, the programming interface 1426 may be configured, for example, to enable a user to run any program (e.g., any user space program) with any argument on the computational module 1430.

In the embodiment illustrated in FIG. 14, a programming interface 1436 may implement a first kernel bucket 1482-1 configured to receive the name of a program, and a second kernel bucket 1482-2 configured to receive any number (including zero) of arguments for the program. A user may invoke the program, for example, by sending a command 1484 from the host 1402 to the computational device 1426 through a connection 1403.

In some embodiments, the command 1484 may be implemented as a dedicated command for invoking a program. For example, in the embodiment illustrated in FIG. 14, the command 1484 may be implemented as a dedicate command (e.g., an NVMe command) named trace, but any other unreserved name may be used. The trace command may have a first parameter -t, which may indicate the name of the program to be run, and a second parameter -a, which may include one or more arguments to be passed to the program when it is started. In some embodiments, the command 1484 may be implemented with a multi-purpose command having another parameter (in addition to the -t and -a parameters) that may indicate that the user intends to invoke the program indicated by the -t parameter with the -a arguments.

The command 1484 may be received by command logic 1428 in the device controller 1442 (as shown by arrow 1486) which may forward the command 1484 to the programming interface 1436 (as shown by arrow 1488). Alternatively, or additionally, the command may be forwarded to the programming interface by parsing logic such as that illustrated in FIG. 6 and/or FIG. 13, or the command may be sent directly to the programming interface, for example, as shown in FIG. 10.

In some embodiments, the programming interface 1436 may allow a user to run any user space program including, for example, a tool program, a utility program, a downloaded user program, and/or the like. In some embodiments, the programming interface 1436 may allow a user to run any of the user space programs that may be provided by the operating system such as those located in the/user/bin and/or user/sbin folders in the Linux operating system. In some embodiments, the programming interface 1436 may limit the type of program a user is allowed to run based, for example, on a user's level of privilege, the availability of computational resources available at the computational module 1430, and/or the like.

The command logic 1428 may forward the trace command 1484, for example, by writing the -t parameter (e.g., program name) to the first kernel bucket 1482-1 and writing the -a parameter (e.g., arguments for the program, if any) to the second kernel bucket 1482-2. In some embodiments, this may trigger a function call by the kernel which may start the program while passing any arguments that may have been written to second kernel bucket 1482-2 to the program.

In some embodiments, the program invoked by the trace command may generate an output result file 1490 which may be sent to the host 1402, for example, by writing it to a file location that may be predetermined, for example, in a manner similar to the files used for kernel buckets as illustrated in Table 2. Alternatively, or additionally, the output result file 1490 which may be sent to the host 1402 in response to the host 1402 issuing a command such as a read command, a Get Log Page command, and/or the like, that may be forwarded to the programming interface 1436 by a write to, or read from, a specified kernel bucket.

Figure 15:
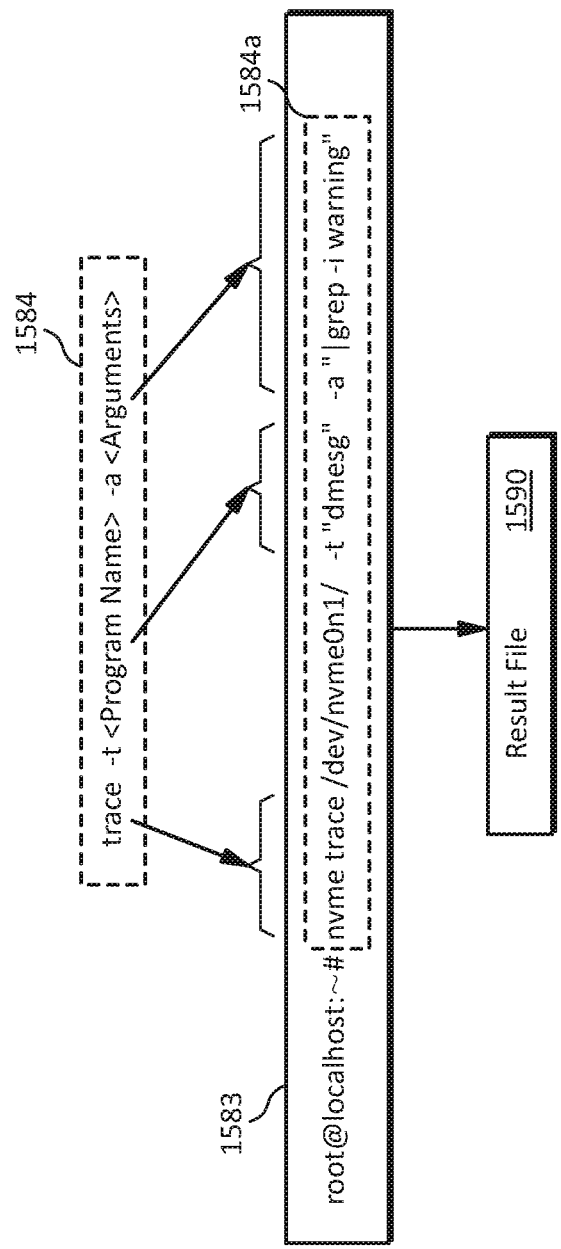
FIG. 15 illustrates an embodiment of a method for invoking a program using a programming interface for a computational device in accordance with example embodiments of the disclosure.

FIG. 15 illustrates an embodiment of a method for invoking a program using a programming interface for a computational device in accordance with example embodiments of the disclosure. The method illustrated in FIG. 15 may be used, for example, to invoke a program using the system illustrated in FIG. 14. For purposes of illustration, FIG. 15 is illustrated in the context of a Linux based operating system, but any other operating system may be used.

Referring to FIG. 15, a user, using a CLI 1583 at a host, may input the command 1584*a* which may have the format 1584. In this example, the command 1584*a* may include the command name trace (which may also include a path name to the folder in which the command is located), the -t parameter indicating the name of the program to be run (which in this example may be the dmesg program), and the -a parameter which may include one or more arguments to be passed to the program at startup. In this example, the -a parameter may include the string "|grep -i warning" which may specify that the output may be filtered using the grep filter to output instances of the pattern "warning" and ignoring the case of the pattern.

The CLI 1583 at the host may send the command 1584*a* to a computational device where the command may be forwarded to a programming interface, for example, by writing the -t and/or -a parameters to one or more kernel buckets. A kernel running on a computational module at the computational device may start dmesg program while passing the "|grep -i warning" argument to the program. The dmesg program may generate an output result file 1590 that may include any number (including zero) of instances of the pattern "warning" generated by the dmesg program.

Figure 16:
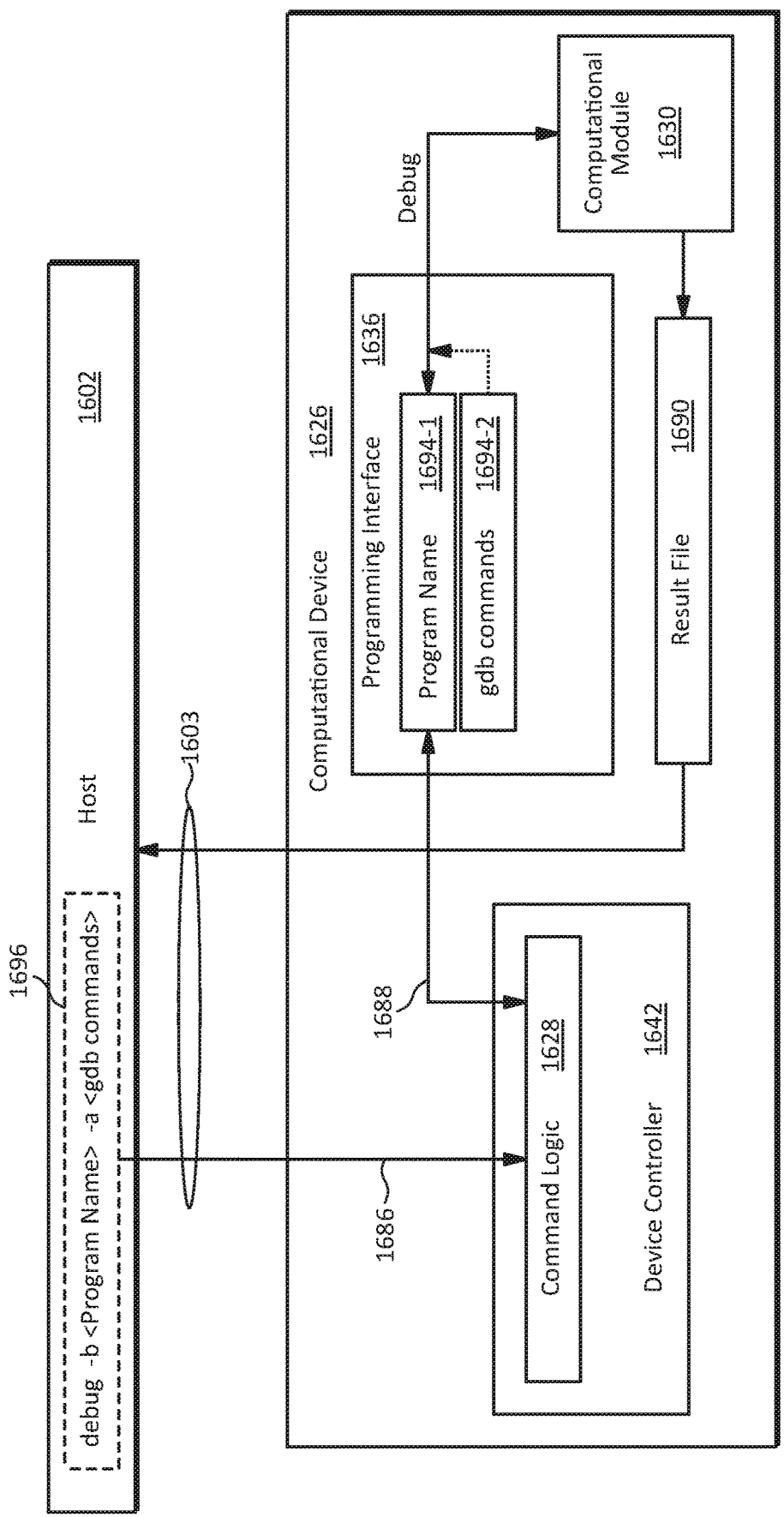
FIG. 16 illustrates an embodiment of a system having a computational device with a programming interface configured to enable a user to debug a program in accordance with example embodiments of the disclosure.

FIG. 16 illustrates an embodiment of a system having a computational device with a programming interface configured to enable a user to debug a program in accordance with example embodiments of the disclosure. The embodiment illustrated in FIG. 16 may include some components similar to those illustrated in FIG. 5, FIG. 6, and/or FIG. 14 where elements indicated by reference numerals ending in the same digits may be similar. However, in the embodiment illustrated in FIG. 16, the programming interface 1636 may be configured to enable a user to debug a program while running the program on the computational module 1630.

In the embodiment illustrated in FIG. 16, a programming interface 1636 may implement a first kernel bucket 1694-1 configured to receive the name of a program to be debugged, and a second kernel bucket 1694-2 configured to receive any number (including zero) of commands for a debugging tool. A user may invoke the program with debugging, for example, by sending a command 1696 from the host 1602 to the computational device 1626 through a connection 1603.

In some embodiments, the command 1696 may be implemented as a dedicated command for debugging a program. For example, in the embodiment illustrated in FIG. 16, the command 1696 may be implemented as a dedicate command (e.g., an NVMe command) named debug, but any other unreserved name may be used. The debug command may have a first parameter -b, which may indicate the name of the program to be debugged, and a second parameter -a, which may include one or more commands for the debugging tool. In some embodiments, the command 1696 may be implemented with a multi-purpose command having another parameter (in addition to the -b and -a parameters) that may indicate that the user intends to debug the program indicated by the -b parameter.

In some embodiments, the debug command 1696 may start a program using one or more debugging tools such as GNU debug (which may also be referred to as GDB or gdb), but any debugging tools may be used. Examples of debugging commands that may be used with one or more debugging tools may include breakpoint, print, continue, backtrace, and/or the like.

The debug command 1696 may be received by command logic 1628 in the device controller 1642 (as shown by arrow 1686) which may forward the debug command 1696 to the programming interface 1636 (as shown by arrow 1688).

Alternatively, or additionally, the debug command may be forwarded to the programming interface by parsing logic such as that illustrated in FIG. 6 and/or FIG. 13, or the debug command may be sent directly to the programming interface, for example, as shown in FIG. 10.

In some embodiments, the programming interface 1636 may allow a user to debug any user space program including, for example, a tool program, a utility program, a downloaded user program, and/or the like. In some embodiments, the programming interface 1636 may limit the type of program a user is allowed to debug based, for example, on a user's level of privilege, the availability of computational resources available at the computational module 1630, and/or the like.

The command logic 1628 may forward the debug command 1696, for example, by writing the -b parameter (e.g., program name) to the first kernel bucket 1694-1 and writing the -a parameter (e.g., commands for the debugging tool, if any) to the second kernel bucket 1694-2. In some embodiments, this may trigger a function call by the kernel which may start the specified program using the debugging tool.

In some embodiments, the debugging tool may generate an output result file 1690 which may be sent to the host 1602, for example, by writing it to a file location that may be predetermined, for example, in a manner similar to the files used for kernel buckets as illustrated in Table 2. Alternatively, or additionally, the output result file 1690 which may be sent to the host 1602 in response to the host 1602 issuing a command such as a read command, a Get Log Page command, and/or the like, that may be forwarded to the programming interface 1636 by a write to, or read from, a specified kernel bucket.

Depending on the implementation details, the embodiment illustrated in FIG. 16 may enable debugging capabilities (e.g., alternative debugging capabilities) with little or no overhead and/or little or no effect on performance, for example, because it may not involve a client-server model between the host 1602 and the computational device 1626, which may continuously pass data between the host 1602 and the computational device 1626 based on every debugging command specified with the -a parameter.

Figure 17:
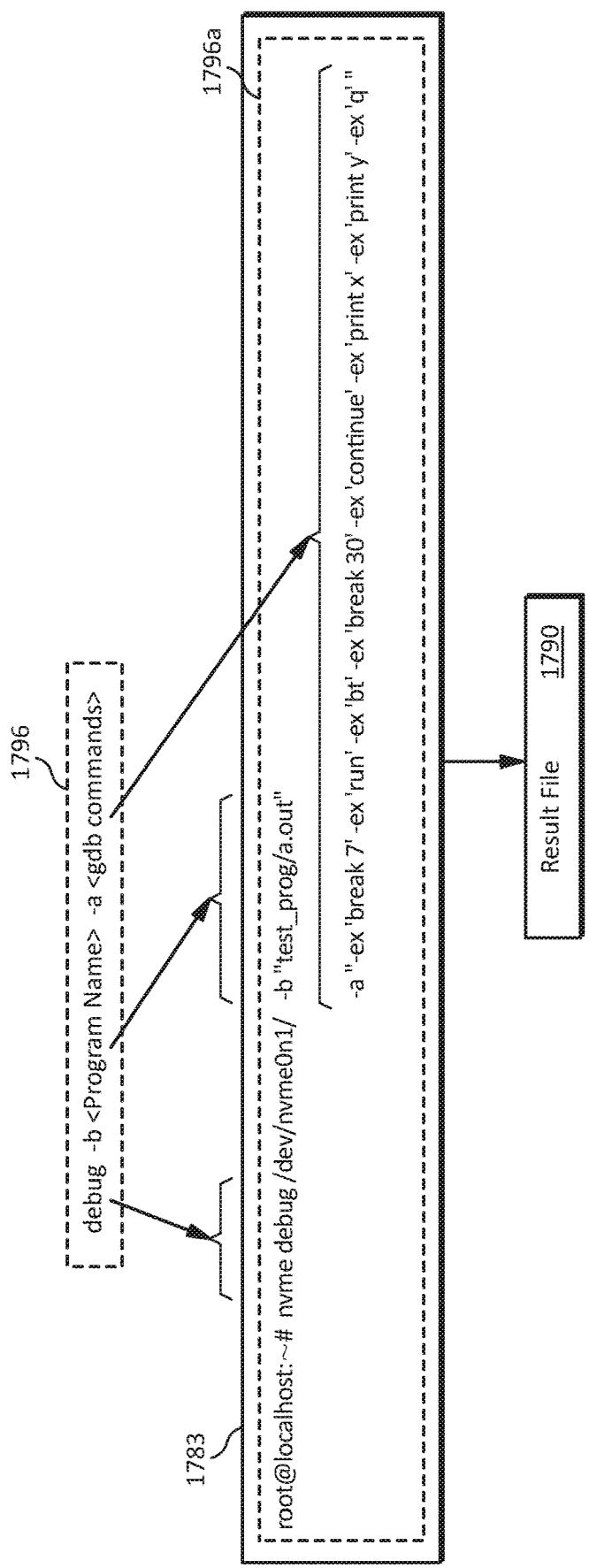
FIG. 17 illustrates an embodiment of a method for debugging a program using a programming interface for a computational device in accordance with example embodiments of the disclosure.

FIG. 17 illustrates an embodiment of a method for debugging a program using a programming interface for a computational device in accordance with example embodiments of the disclosure. The method illustrated in FIG. 17 may be used, for example, to debug a program using the system illustrated in FIG. 16. For purposes of illustration, FIG. 17 is illustrated in the context of a Linux" based operating system, but any other operating system may be used.

Referring to FIG. 17, a user, using a CLI 1783 at a host, may input the command 1796a which may have the format 1796. The command 1796a may include the command name debug (which may also include a path name to the folder in which the command is located), the -b parameter indicating the name of the program to be debugged (which in this example may be named test_prog), and the -a parameter which may include one or more commands to be passed to the debugging tool.

In this example, the -a parameter may include the string "-ex 'break 7'-ex 'run'-ex 'bt'-ex 'break 30'-ex 'continue'-ex 'print x'-ex 'print y'-ex 'q'" where each instance of -ex indicates to the debugging tool to execute the next command between single quotes. In this example, the break commands indicate to break at the specified line numbers, the run command indicates to run the program, the continue command indicates to continue executing the program, the print command indicates to print the specified variable (e.g., to an output file as described below), and the q command indicates to quit the program.

The CLI 1783 at the host may send the command 1796a to a computational device where the command may be forwarded to a programming interface, for example, by writing the -b and/or -a parameters to one or more kernel buckets. A kernel running on a computational module at the computational device may start the program with the debugging tool which may generate an output result file 1790 that may include the output generated by the debugging tool while running the program.

Table 3 illustrates example source code for the program test_prog illustrated in FIG. 17, and Table 4 illustrates example contents of the output file 1790 generated by the debugging tool while debugging test_prog in accordance with example embodiments of the disclosure.

TABLE 3

| 1  | #include <stdio.h> |
| 2  | #include <stdlb.h> |
| 3  | |
| 4  | |
| 5  | void function_3( ) |
| 6  | { |
| 7  |     printf ("going back to main\n"); |
| 8  | } |
| 9  | |
| 10 | void function_2( ) |
| 11 | { |
| 12 |     function_3( ); |
| 13 | } |
| 14 | |
| 15 | void function_1( ) |
| 16 | { |
| 17 |     function_2( ); |
| 18 | |
| 19 | } |
| 20 | |
| 21 | int main( ) |
| 22 | { |
| 23 | |
| 24 |     printf ("hello world\n"); |
| 25 | |
| 26 |     function_1( ); |
| 27 |     int x=5; |
| 28 |     int y=5+x; |
| 29 | |
| 30 |     printf ("done running - exiting\n") ; |
| 31 |     return 0 ; |
| 32 | } |

TABLE 4

| 1  | Breakpoint 1 at 0x4005c8: file prog_0.c, line 7 |
| 2  | Starting program: /root/slot_0./a.out |
| 3  | |
| 4  | Breakpoint 1, function_3( ) at prog_0.c:7 |
| 5  | 7    printf("going back to main\n"); |
| 6  | #0  function_3( ) at prog_0.c:7 |
| 7  | #1  0x00000000004005ec in function_2( ) at prog_0.c:12 |
| 8  | #2  0x0000000000400604 in function_1( ) at prog_0.c:17 |
| 9  | #3  0x0000000000400628 in main( ) at prog_0.c:26 |
| 10 | Breakpoint 2 at 0x040063c: file prog_@.c, line 30. |
| 11 | Continuing. |
| 12 | |
| 13 | Breakpoint 2, main ( ) at prog_0.c:30 |
| 14 | 30    printf("done running - exiting\n") ; |
| 15 | $1 = 5 |
| 16 | $2 = 10 |
| 17 | A debugging session is active. |
| 18 | |
| 19 |     Inferior 1 [process 1454] will be killed. |
| 20 | |
| 21 | Quit anyway? (y or n) [answered Y; input not from terminal] |

Referring to FIG. 17, Table 3, and Table 4:
the -ex 'break7' command in the -a parameter may correspond to line 7 in Table 3 and lines 4-5 in Table 4;
the -ex 'bt' command may correspond to the backtracing at lines 5-10 of Table 4;

the -ex 'break 30' command may correspond to line 30 in Table 3 and line 10 in Table 4;

the -ex 'print x' and -ex 'print y' commands may correspond to lines 15 and 16, respectively, in Table 4; and the -ex 'q' command may correspond to line 21 in Table 4.

The actual program output may be printed to the standard output (e.g., to a terminal window) with the printf instruction within the program and therefore may not appear in the output file 1790 generated by the debugging tool.

For purposes of illustration, the embodiments illustrated in FIG. 16, FIG. 17, Table 3, and Table 4 may be described in the context of a debugging program. However, in other embodiments, other types of analysis programs such as tracing, profiling, and/or the like may be implemented.

Any of the programming interfaces disclosed herein may be added to a kernel of an operating system in any suitable manner. For example, in some embodiments, code for a programming interface may be implemented as a kernel module that may be inserted into, and/or removed from, the kernel. As another example, code for a programming interface may be implemented as kernel code and compiled with the kernel.

In some embodiments in which a programming interface may be implemented as a kernel module, when a new computational device is added to a system, the module (along with one or more drivers, if any) may be installed, for example, as part of initializing the computational device. In some embodiments, the programming interface module may be left as part of the kernel indefinitely. In some embodiments, the programming interface module may be inserted temporarily, for example, for debugging a new program, debugging a new computational device, debugging a malfunctioning computational device, and/or the like, then removed after the debugging process is completed, for example, to save memory and/or storage space. In some embodiments, the removal and/or installation of a kernel module may be initiated manually by a user, for example, using a command line interface. In some embodiments, the removal and/or installation of a kernel module may be initiated automatically, for example, a kernel module may be automatically removed if it is not used for a period of time. In some embodiments, the programming interface module may be inserted for purposes of installing a new operating system, kernel, and/or programming interface, updating an operating system, kernel, and/or programming interface, and/or the like. In some embodiments, inserting and/or removing the programming interface module may be accomplished using the programming interface, for example, by issuing a command (e.g., an NVMe command) through the interface.

Figure 18:
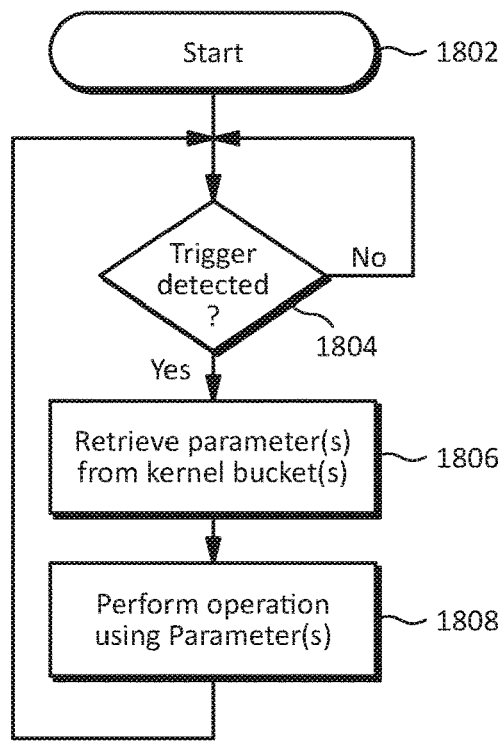
FIG. 18 illustrates an example embodiment of a method for operating a programming interface for a computational device in accordance with example embodiments of the disclosure.

FIG. 18 illustrates an example embodiment of a method for operating a programming interface for a computational device in accordance with example embodiments of the disclosure. The method illustrated in FIG. 18 may be used, for example, to implement any of the programming interfaces as disclosed herein. The method illustrated in FIG. 18 may be performed, for example, by a kernel of an operating system running on a computational module of a computational device.

The method may begin at operation 1802, for example, when a computational device is initialized. At operation 1804, the method may wait for a trigger event such as writing or reading a kernel bucket. If no trigger is detected, the method may loop back to operation 1804 until a trigger is detected. If a trigger is detected at operation 1804, the method may proceed to operation 1806 where the method may retrieve the parameters (if any) that have been written to one or more kernel buckets. Examples of parameters may include an identification of a program to execute (e.g., a slot number or Slot ID, a number of arguments, the actual arguments (if any), an identification of a program to debug, one or more debugging commands, and/or the like. At operation 1808, the method may perform an operation that may have been requested by the trigger. For example, a program located in a program slot may be executed, data may be transferred from the kernel to a user space, host, and/or the like, a program may be debugged, and/or the like. Upon completion of the operation 1808, the method may return to operation 1804 to wait for another trigger.

Depending on the implementation details, some embodiments may implement any number of the following features and/or provide any number of the following advantages.

Some embodiments may implement a mechanism to pass computational commands and return output data back between firmware, a driver, and/or the like, and one or more computational resources of a computational device through an interface (e.g., an interface using an NVMe protocol).

In some embodiments, a virtual interface may expose one or more kernel buckets to a user space that can be used as triggers, for example, to trigger actions in a kernel of an operating system running on one or more computational resources of a computational device, and/or to export information from the kernel to a user space.

In some embodiments, a trigger may be tailored to target one or more specific computational engines such as an ASIC, an FPGA, a processor (e.g., an ARM processor), and/or the like. In some embodiments, a trigger may be tailored to target one or more specific CPU cores, for example, by pinning a CPU core to the process that will be executed.

Some embodiments may provide a mechanism, interface, infrastructure, and/or the like, that may bridge between the firmware, a driver, and/or the like, and the computational device to execute commands or export information back in a computational storage device environment.

Some embodiments may provide an efficient mechanism for internal information passing for computational storage devices.

Some embodiments may shield a user from the complexity of a kernel. For example, some embodiments may virtualize one or more hooks to the kernel as kernel buckets and hide the rest of the system. In some embodiments, depending on the implementation details, this may improve security. In some embodiments, command logic may simply parse commands and write them to kernel buckets without needing knowledge of low level Linux® system calls. Some embodiments may provide a relatively simple interface that may expose relevant aspects of the kernel and/or limit or eliminate irrelevant aspects of the kernel.

Some embodiments may provide a virtual interface that may reduce or remove dependency between a device controller and the kernel. Depending on the implementation details, this may enable a programming interface to accommodate changes to the kernel, operating system, device controller, and/or the like, with little or no change to the programming interface presented to a user. For example, in some embodiments, a programming interface written as a kernel module may be used with different versions of a kernel with few or no changes to the module. For example, in some embodiments, a programming interface may be inserted into any kernel release with few or no changes being needed in the programming interface, the system, and/or the like.

In some embodiments, directories and/or files associated with the programming interface (e.g., kernel buckets implemented as files) may be cleaned up, in some cases automatically by the kernel, for example, when a computational device is removed from a system, when a kernel module is removed from the kernel, and/or the like.

Some embodiments may provide a general interface to pass information to a kernel and/or export information from a kernel. In some embodiments, the number and/or type of kernel objects that may be exposed using a virtual interface may be unlimited. Thus, a generic interface may be implemented to pass commands, information, and/or the like between a kernel and firmware, a driver, and/or the like.

In some embodiments, an interface may be bidirectional. For example, information and/or requests may be passed to a kernel by writing to a bucket, and information may be passed from a kernel to a user space by reading a bucket. For example, if a kernel object is a slot ID, a programming interface may be configured to return the binary name loaded in that slot, or an indication of which computational units may be idle and may be used to execute a program (e.g., an executable binary).

Some embodiments may implement rules and/or error checking for parameters passed through a programming interface. For example, a programming interface may check if a user passes a string and/or an integer as a parameter. As another example, a programming interface may implement a per object rule (e.g., a one item per object rule). Depending on the implementation details, this may reduce or eliminate passing long strings that may cause a kernel panic if the string includes one or more errors.

Some embodiments may accommodate (e.g., ensure and/or guarantee) atomicity. For example, in some embodiments, a programming interface, upon receiving a trigger, may wait until all arguments are passed and received before calling an associated trigger function. As another example, in some embodiments, if there is specific order to execute one or more commands, a programming interface may rearrange the commands to execute them in a specific order. This may be implemented, for example, by writing to one or more particular registers and/or buckets to enable certain settings before executing the command.

Some embodiments may provide a generic pluggable programming interface that may be inserted and/or removed without changing kernel code to move data in a bidirectional fashion between the kernel and user space and vice versa. Moreover, some embodiments may be applied to a diverse range of computational devices.

In some embodiments, memory (e.g., virtual memory) may be divided into kernel space and user space. For example, some or all kernel space may be reserved for running the kernel, kernel extensions, some or most device drivers, and/or the like, while user space may be one or more memory areas where some or all user-mode applications operate. In some embodiments, interaction between user space and kernel space may be implemented using one or more techniques such as: (1) input-output control (IOCTL) which may be a system call that may, for example, manipulate underlying device parameters of files; (2) procfs and/or sysfs which may be implemented as pseudo-filesystems that may provide an interface to kernel data structures; (3) sockets; and/or the like.

In some embodiments, using virtual files may enable the export of information about various kernel sub-systems, hardware devices, and/or associated device drivers from a kernel device model to a user space. Examples of techniques for exporting device information may include entries in any of the following Linux® directories: /sys/block, /sys/bus, /sys/class, /sys/devices, /sys/firmware, /sys/module, and/or the like.

Figure 19:
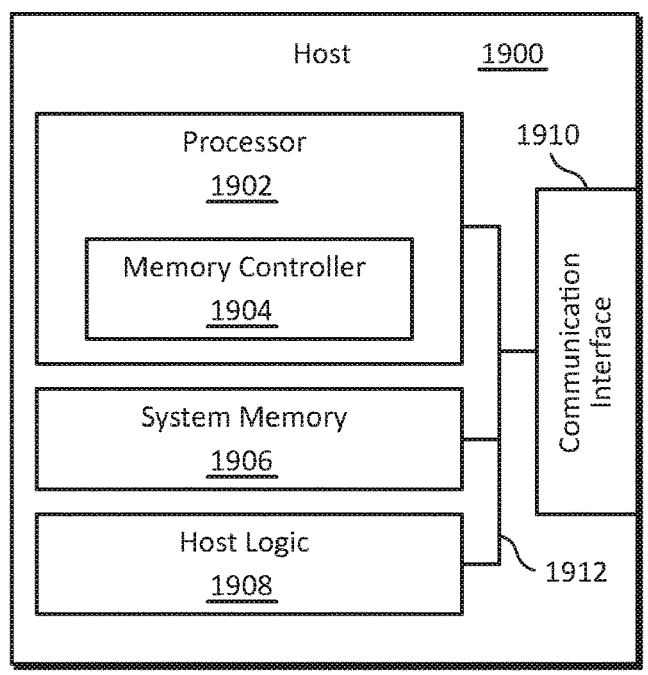
FIG. 19 illustrates an example embodiment of a host apparatus in accordance with example embodiments of the disclosure.

FIG. 19 illustrates an example embodiment of a host apparatus in accordance with example embodiments of the disclosure. The host apparatus illustrated in FIG. 19 may be used, for example, to implement any of the hosts disclosed herein. The host apparatus 1900 illustrated in FIG. 19 may include a processor 1902, which may include a memory controller 1904, a system memory 1906, host logic 1908, and/or communication interface 1910. Any or all of the components illustrated in FIG. 19 may communicate through one or more system buses 1912. In some embodiments, one or more of the components illustrated in FIG. 19 may be implemented using other components. For example, in some embodiments, the host control logic 1908 may be implemented by the processor 1902 executing instructions stored in the system memory 1906 or other memory. In some embodiments, the host logic 1908 may implement any of the host functionality disclosed herein including, for example, sending commands, command line interfaces, initiator device drivers, and/or the like.

Figure 20:
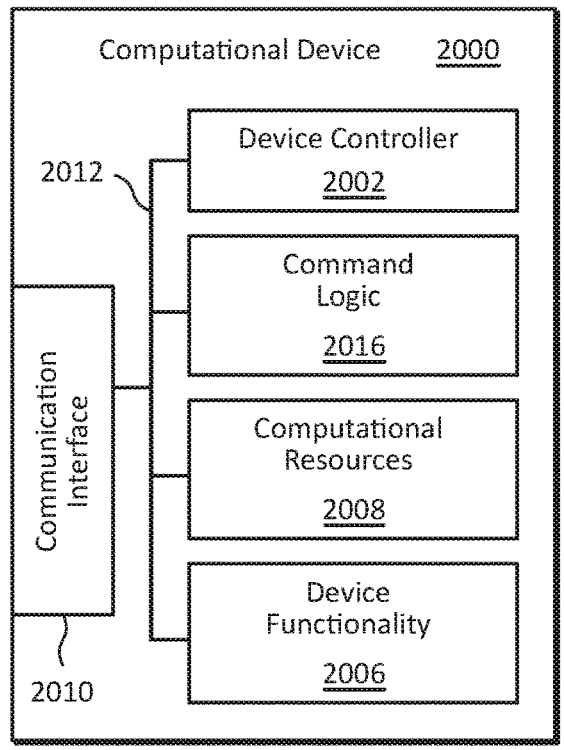
FIG. 20 illustrates an example embodiment of a computational device that may be used to provide a user with access to one or more computational resources through a programming interface in accordance with example embodiments of the disclosure.

FIG. 20 illustrates an example embodiment of a computational device that may be used to provide a user with access to one or more computational resources through a programming interface in accordance with example embodiments of the disclosure. The embodiment 2000 illustrated in FIG. 20 may be used, for example, to implement any of the computational devices disclosed herein. The computational device 2000 may include a device controller 2002, one or more computational resources 2008, command logic 2016, a device functionality circuit 2006, and a communication interface 2010. The components illustrated in FIG. 20 may communicate through one or more device buses 2012.

The device functionality circuit 2006 may include any hardware to implement the primary function of the device 2000. For example, if the device 2000 is implemented as a storage device, the device functionality circuit 2006 may include a storage medium such as one or more flash memory devices, an FTL, and/or the like. As another example, if the device 2000 is implemented as a network interface card (NIC), the device functionality circuit 2006 may include one or more modems, network interfaces, physical layers (PHYs), medium access control layers (MACs), and/or the like. As a further example, if the device 2000 is implemented as an accelerator, the device functionality circuit 2006 may include one or more accelerator circuits, memory circuits, and/or the like.

Figure 21:
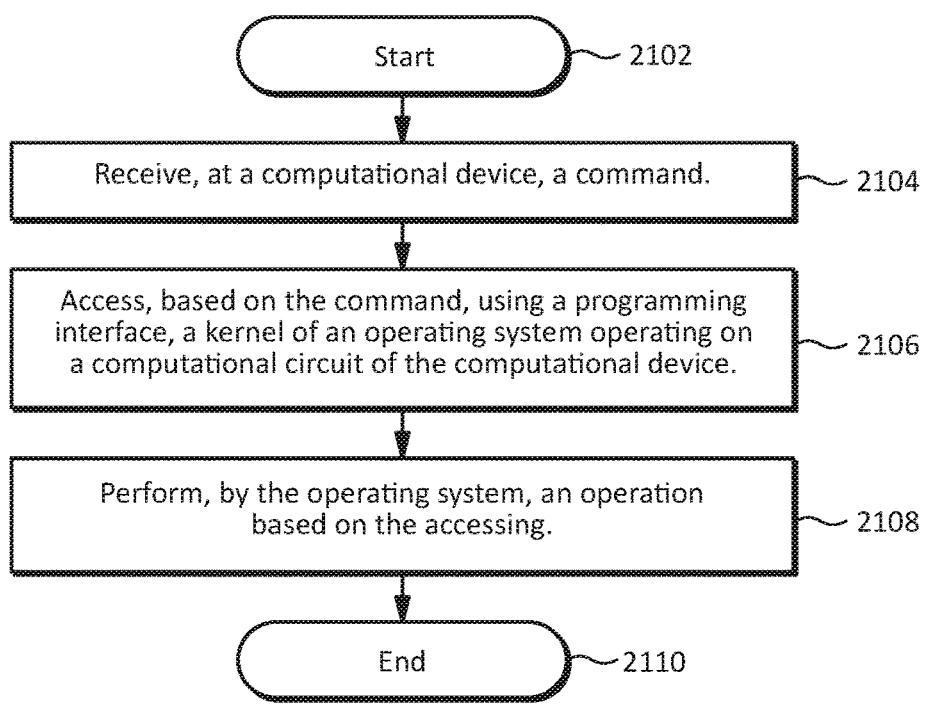
FIG. 21 illustrates an embodiment of a method for providing a user with access to one or more computational resources of a computational device through a programming interface in accordance with example embodiments of the disclosure.

FIG. 21 illustrates an embodiment of a method for providing a user with access to one or more computational resources of a computational device through a programming interface in accordance with example embodiments of the disclosure. The method may begin at operation 2102. At operation 2104, the method may receive, at a computational device, a command. At operation 2106, the method may access, based on the command, using a programming interface, a kernel of an operating system operating on a computational circuit of the computational device. At operation 2108, the method may perform, by the operating system, an operation based on the accessing. The method may end at operation 2110.

The embodiment illustrated in FIG. 21, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

As mentioned above, any of the functionality described herein, including any of the host functionality, device functionally, and/or the like, may be implemented with hardware, software, firmware, or any combination thereof including combinational logic, sequential logic, one or more timers, counters, registers, state machines, volatile memories such as DRAM and/or SRAM, nonvolatile memory and/or any combination thereof, CPLDs, FPGAs, ASICs, CPUs including CISC processors such as x86 processors and/or RISC processors such as ARM processors, GPUs, NPUs, and/or the like, executing instructions stored in any type of memory. In some embodiments, one or more components may be implemented as a system-on-chip (SOC).

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
receiving, at a computational device, a request to load a user program to a location on the computational device;
receiving, at the computational device, a command corresponding to an operation supported by the computational device;
parsing control information from the command, wherein the control information comprises location information for the user program corresponding to the location on the computational device;
determining, based on the control information, that the command is related to a kernel of an operating system operating on a computational circuit of the computational device;
passing, using a programming interface, the command to the kernel of the operating system, wherein the control information is written to the kernel;
loading, from the location on to the computational device, the user program based on the control information, using the location information; and
starting, by the operating system, the user program based on the control information, wherein the user program receives at least a portion of the control information from the kernel.

2. The method of claim 1, wherein passing the command comprises:
accessing one or more buckets using the programming interface, and writing the command and one or more parameters to the one or more buckets.

3. The method of claim 2, wherein the one or more buckets comprises one or more files.

4. The method of claim 1, wherein the programming interface is configured for bidirectional data transfer.

5. The method of claim 1, further comprising:
loading an analysis program; and
wherein starting the user program comprises running, using the analysis program, the user program on the operating system.

6. The method of claim 5, wherein the analysis program comprises a debugging program.

7. The method of claim 1, wherein:
starting the user program comprises starting, by the kernel, on the operating system, the user program.

8. The method of claim 7, wherein:
the control information further comprises one or more arguments; and
starting the user program comprises starting, by the kernel, with the one or more arguments, the user program.

9. The method of claim 1, wherein:
the control information further comprises an indication of one or more compute resources of the computational circuit; and
starting the user program comprises starting the user program using the one or more compute resources.

10. The method of claim 9, wherein the indication is a first indication, the command comprises one or more parameters comprising one or more second indications of one or more portions of the one or more compute resources, and starting the user program comprises starting the user program using the one or more portions of the one or more compute resources.

11. The method of claim 1, further comprising, returning, using the programming interface, a result of the user program.

12. The method of claim 1, wherein the control information comprises a program slot identifier and a compute engine identifier.

13. A device comprising:
a computational circuit configured to run an operating system comprising a kernel, wherein the kernel is configured to operate a programming interface; and
command logic configured to:
receive a request to load a user program to a location on the device;

receive a command corresponding to an operation supported by the device;

parse control information from the command, wherein the control information comprises location information for the user program corresponding to the location on the device;

determine, based on the control information, that the command is related to the kernel of the operating system operating on the computational circuit;

pass, using the programming interface, the command to the kernel of the operating system; and load, from the location on the device, the user program based on the control information using the location information; wherein the operating system is configured to start, based on the control information, the user program based on the control information; wherein the user program receives at least a portion of the control information from the kernel.

14. The device of claim 13, wherein the command logic comprises a device controller.

15. The device of claim 13, wherein the command is a first command, and the command logic is configured to:

receive a second command; and pass the second command to a device controller.

16. The device of claim 13, wherein the device is a computational storage device.

17. A system comprising:

a host comprising a processor, wherein the host is configured to:

send, using a protocol, a command corresponding to an operation supported by a device, wherein the processor operates a device driver that uses the protocol to send the command; and the device communicatively coupled to the host, the device comprising a computational circuit configured to run an operating system comprising a kernel, wherein the kernel is configured to operate a programming interface;

wherein the device is configured to:

receive a request to load a user program to a location on the device;

receive, using the protocol, the command;

parse control information from the command, wherein the control information comprises location information for the user program corresponding to the location on the device;

determine, based on the control information, that the command is related to the kernel of the operating system operating on the computational circuit;

pass, using the programming interface, the command to the kernel of the operating system; and load, from the location on the device, the user program based on the control information using the location information, wherein the user program receives at least a portion of the control information from the kernel.

18. The system of claim 17, wherein the operating system is configured to start, based on access of the host, the user program based on the control information.

19. The system of claim 17, wherein passing the command comprises accessing one or more buckets using the programming interface.

20. The system of claim 17, wherein the host is further configured to send, using the protocol, the user program to the device based on an indication that the location on the device is available.

* * * * *